(12) United States Patent
Wang et al.

(10) Patent No.: US 11,875,510 B2
(45) Date of Patent: Jan. 16, 2024

(54) GENERATING REFINED SEGMENTATIONS MASKS VIA METICULOUS OBJECT SEGMENTATION

(71) Applicant: Adobe Inc., San Jose, CA (US)

(72) Inventors: Yilin Wang, San Jose, CA (US); Chenglin Yang, Baltimore, MD (US); Jianming Zhang, Campbell, CA (US); He Zhang, San Jose, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 298 days.

(21) Appl. No.: 17/200,525

(22) Filed: Mar. 12, 2021

(65) Prior Publication Data
US 2022/0292684 A1    Sep. 15, 2022

(51) Int. Cl.
*G06K 9/00* (2022.01)
*G06T 7/11* (2017.01)
(Continued)

(52) U.S. Cl.
CPC .............. *G06T 7/11* (2017.01); *G06F 18/213* (2023.01); *G06N 3/044* (2023.01); *G06N 3/08* (2013.01);
(Continued)

(58) Field of Classification Search
CPC ..................... G06T 7/11; G06T 3/4046; G06T 2207/20084; G06T 7/10; G06T 3/4053;
(Continued)

(56) References Cited

U.S. PATENT DOCUMENTS 7,295,700 B2   11/2007   Schiller et al.
7,606,417 B2   10/2009   Steinberg et al.
(Continued)

FOREIGN PATENT DOCUMENTS

CN   106339591 A   1/2017
CN   107103315 A   8/2017
(Continued)

OTHER PUBLICATIONS

Wang, Y., Zhao, X., Li, Y., & Huang, K. (2018). Deep crisp boundaries: From boundaries to higher-level tasks. IEEE Transactions on Image Processing, 28(3), 1285-1298. (Year: 2018).*

(Continued)

*Primary Examiner* — Emily C Terrell
*Assistant Examiner* — Kevin M Coomber
(74) *Attorney, Agent, or Firm* — Keller Preece PLLC

(57) ABSTRACT

The present disclosure relates to systems, methods, and non-transitory computer-readable media that utilizes a neural network having a hierarchy of hierarchical point-wise refining blocks to generate refined segmentation masks for high-resolution digital visual media items. For example, in one or more embodiments, the disclosed systems utilize a segmentation refinement neural network having an encoder and a recursive decoder to generate the refined segmentation masks. The recursive decoder includes a deconvolution branch for generating feature maps and a refinement branch for generating and refining segmentation masks. In particular, in some cases, the refinement branch includes a hierarchy of hierarchical point-wise refining blocks that recursively refine a segmentation mask generated for a digital visual media item. In some cases, the disclosed systems utilize a segmentation refinement neural network that includes a low-resolution network and a high-resolution
(Continued)

network, each including an encoder and a recursive decoder, to generate the refined segmentation masks.

20 Claims, 16 Drawing Sheets

(51) Int. Cl.
- *G06N 3/08* (2023.01)
- *G06T 3/40* (2006.01)
- *G06F 18/213* (2023.01)
- *G06N 3/044* (2023.01)

(52) U.S. Cl.
CPC .. *G06T 3/4046* (2013.01); *G06T 2207/20084* (2013.01)

(58) Field of Classification Search
CPC .......... G06N 3/044; G06N 3/08; G06N 20/00; G06N 3/045; G06F 18/213; G06V 20/80; G06V 10/40; G06V 10/88; G06V 10/255; H03M 13/00; G01B 11/00
See application file for complete search history.

(56) References Cited

U.S. PATENT DOCUMENTS

| | | | |
|---|---|---|---|
| 7,916,917 | B2 | 3/2011 | Dewaele et al. |
| 8,600,143 | B1 | 12/2013 | Kulkarni et al. |
| 8,675,934 | B2 | 3/2014 | Wehnes et al. |
| 9,251,429 | B2 | 2/2016 | Pham et al. |
| 9,342,869 | B2 | 5/2016 | Wang et al. |
| 9,418,319 | B2 | 8/2016 | Shen et al. |
| 9,495,756 | B2 | 11/2016 | Rivet-Sabourin |
| 9,684,967 | B2 | 6/2017 | Abedini et al. |
| 10,192,129 | B2 | 1/2019 | Price et al. |
| 10,210,613 | B2 | 2/2019 | Xu et al. |
| 10,460,214 | B2 | 10/2019 | Lu et al. |
| 10,470,510 | B1 | 11/2019 | Koh et al. |
| 10,643,331 | B2 | 5/2020 | Ghesu et al. |
| 10,679,046 | B1 | 6/2020 | Black et al. |
| 10,846,566 | B2 | 11/2020 | Zhu et al. |
| 11,335,004 | B2 | 5/2022 | Liu et al. |
| 2001/0051852 | A1 | 12/2001 | Sundaravel et al. |
| 2003/0081833 | A1 | 5/2003 | Tilton |
| 2004/0042662 | A1 | 3/2004 | Wilensky et al. |
| 2004/0190092 | A1 | 9/2004 | Silverbrook et al. |
| 2004/0202368 | A1 | 10/2004 | Lee et al. |
| 2006/0045336 | A1 | 3/2006 | Lim |
| 2006/0285743 | A1 | 12/2006 | Oh et al. |
| 2007/0165949 | A1 | 7/2007 | Sinop et al. |
| 2009/0252429 | A1 | 10/2009 | Prochazka et al. |
| 2010/0183225 | A1 | 7/2010 | Vantaram et al. |
| 2010/0226566 | A1 | 9/2010 | Luo et al. |
| 2010/0322488 | A1 | 12/2010 | Virtue et al. |
| 2011/0188720 | A1 | 8/2011 | Narayanan et al. |
| 2011/0216975 | A1 | 9/2011 | Rother et al. |
| 2011/0285874 | A1 | 11/2011 | Showering et al. |
| 2012/0201423 | A1 | 8/2012 | Onai et al. |
| 2014/0010449 | A1 | 1/2014 | Haaramo et al. |
| 2014/0056472 | A1 | 2/2014 | Gu |
| 2014/0334667 | A1 | 11/2014 | Eswara et al. |
| 2015/0117783 | A1 | 4/2015 | Lin et al. |
| 2015/0269427 | A1 | 9/2015 | Kim et al. |
| 2016/0232425 | A1 | 8/2016 | Huang et al. |
| 2017/0032551 | A1 | 2/2017 | Fried et al. |
| 2017/0116497 | A1 | 4/2017 | Georgescu et al. |
| 2017/0140236 | A1 | 5/2017 | Price et al. |
| 2017/0169313 | A1 | 6/2017 | Choi et al. |
| 2017/0169567 | A1 | 6/2017 | Chefd'hotel et al. |
| 2017/0213349 | A1 | 7/2017 | Kuo et al. |
| 2017/0231550 | A1 | 8/2017 | Do et al. |
| 2017/0244908 | A1 | 8/2017 | Flack et al. |
| 2017/0249739 | A1 | 8/2017 | Kallenberg et al. |
| 2017/0287137 | A1 | 10/2017 | Lin et al. |
| 2018/0061046 | A1 | 3/2018 | Bozorgtabar et al. |
| 2018/0108137 | A1 | 4/2018 | Price et al. |
| 2018/0137335 | A1 | 5/2018 | Kim et al. |
| 2018/0182101 | A1 | 6/2018 | Petersen et al. |
| 2018/0240243 | A1 | 8/2018 | Kim et al. |
| 2019/0057507 | A1* | 2/2019 | El-Khamy ............. G06V 10/82 |
| 2019/0108414 | A1 | 4/2019 | Price et al. |
| 2019/0236394 | A1 | 4/2019 | Price et al. |
| 2019/0130229 | A1 | 5/2019 | Lu et al. |
| 2019/0340462 | A1 | 11/2019 | Pao et al. |
| 2019/0357615 | A1 | 11/2019 | Koh et al. |
| 2020/0143194 | A1 | 5/2020 | Hou et al. |
| 2020/0167930 | A1* | 5/2020 | Wang .................... G06T 7/0012 |
| 2020/0388071 | A1 | 12/2020 | Grabner et al. |
| 2021/0027098 | A1 | 1/2021 | Ge et al. |
| 2021/0082118 | A1 | 3/2021 | Zhang et al. |
| 2021/0217178 | A1 | 7/2021 | Terzopoulos et al. |
| 2021/0248748 | A1 | 8/2021 | Turgutlu et al. |
| 2021/0290096 | A1 | 9/2021 | Yang |
| 2021/0295507 | A1 | 9/2021 | Nie |
| 2022/0044366 | A1 | 2/2022 | Zhang et al. |
| 2022/0044407 | A1 | 2/2022 | Liu et al. |
| 2022/0108454 | A1 | 4/2022 | Tsai et al. |
| 2022/0237799 | A1 | 7/2022 | Price et al. |
| 2022/0262009 | A1 | 8/2022 | Yu et al. |
| 2022/0292684 | A1 | 9/2022 | Wang et al. |
| 2022/0375079 | A1 | 11/2022 | Finley et al. |

FOREIGN PATENT DOCUMENTS

| | | | |
|---|---|---|---|
| CN | 110232689 A * | 9/2019 | ............. G06F 16/56 |
| DE | 102015207047 A1 | 10/2015 | |
| WO | WO 2015177268 A1 | 11/2015 | |
| WO | WO 2018/229490 A1 | 12/2018 | |

OTHER PUBLICATIONS

Le, T., & Duan, Y. (2020). REDN: a recursive encoder-decoder network for edge detection. IEEE Access, 8, 90153-90164. (Year: 2020).*

Zhao, H., Shi, J., Qi, X., Wang, X., & Jia, J. (2017). Pyramid scene parsing network. In Proceedings of the IEEE conference on computer vision and pattern recognition (pp. 2881-2890). (Year: 2017).*

Zhang, Y., Li, X., Lin, M., Chiu, B., & Zhao, M. (2020). Deep-recursive residual network for image semantic segmentation. Neural computing and applications, 32, 12935-12947. (Year: 2020).*

Li et al., Interactive Image Segmentation with Latent Diversity, 2018, IEEE 2575-7075/18, DOI 10.11/09/CVPR. 2018.00067, pp. 577-585. (Year: 2018).

Xu et al., Deep Interactive Object Selection, Mar. 13, 2016 arXiv:1603.04042v1 [cs.CV], pp. 1-9. (Year: 2016).

U.S. Appl. No. 16/231,746, Jun. 11, 2021, 1st Action Office Action.

Intention to Grant as received in UK application GB1915436.8 dated Aug. 25, 2021.

U.S. Appl. No. 16/216,739, Sep. 13, 2021, Office Action.

Ali Borji, Ming-Ming Cheng, Qibin Hou, Huaizu Jiang, and Jia Li. Salient object detection: A survey. Computational visual media, pp. 1-34, 2019.

Ali Borji and Laurent Itti. State-of-the-art in visual attention modeling. IEEE transactions on pattern analysis and machine intelligence, 35(1):185-207, 2012.

Liang-Chieh Chen, George Papandreou, Iasonas Kokkinos, Kevin Murphy, and Alan L Yuille. Semantic image segmentation with deep convolutional nets and fully connected crfs. arXiv preprint arXiv:1412.7062, 2014.

Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801-818, 2018.

Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.

(56) References Cited

OTHER PUBLICATIONS

Ming-Ming Cheng, Niloy J Mitra, Xiaolei Huang, Philip H S Torr, and Shi-Min Hu. Global contrast based salient region detection. IEEE transactions on pattern analysis and machine intelligence, 37(3):569-582, 2014.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In Proceedings of the IEEE International Conference on Computer Vision, pp. 1314-1324, 2019.
Gao Huang, Zhuang Liu, Laurens Van Der Maaten, and Kilian Q Weinberger. Densely connected convolutional net- works. In Proceedings of the IEEE conference on computer vision and pattern recognition, pp. 4700-4708, 2017.
Laurent Itti, Christof Koch, and Ernst Niebur. A model of saliency-based visual attention for rapid scene analysis. IEEE Transactions on pattern analysis and machine intelligence, 20(11):1254-1259, 1998.
Alexander Kirillov, Yuxin Wu, Kaiming He, and Ross Girshick. Pointrend: Image segmentation as rendering. In Proceedings of the IEEE/CVF Conference on Computer Vision and Pattern Recognition, pp. 9799-9808, 2020.
Dominik A Klein and Simone Frintrop. Center-surround divergence of feature statistics for salient object detection. In 2011 International Conference on Computer Vision, pp. 2214-2219. IEEE, 2011.
Philipp Krahenbuhl and Vladlen Koltun. Efficient inference in fully connected crfs with gaussian edge potentials. In Advances in neural information processing systems, pp. 109-117, 2011.
Alex Krizhevsky, Ilya Sutskever, and Geoffrey E Hinton. Imagenet classification with deep convolutional neural networks. In Advances in neural information processing systems, pp. 1097-1105, 2012.
Guanbin Li and Yizhou Yu. Visual saliency based on multi-scale deep features. In Proceedings of the IEEE conference on computer vision and pattern recognition, pp. 5455-5463, 2015.
Xiang Li, Tianhan Wei, Yau Pun Chen, Yu-Wing Tai, and Chi-Keung Tang. Fss-1000: A 1000-class dataset for few-shot segmentation. In Proceedings of the IEEE/CVF Conference on Computer Vision and Pattern Recognition, pp. 2869-2878, 2020.
Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.
Guosheng Lin, Chunhua Shen, Anton Van Den Hengel, and Ian Reid. Efficient piecewise training of deep structured models for semantic segmentation. In Proceedings of the IEEE conference on computer vision and pattern recognition, pp. 3194-3203, 2016.
Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.
Nian Liu and Junwei Han. Dhsnet: Deep hierarchical saliency network for salient object detection. In Proceedings of the IEEE Conference on Computer Vision and Pattern Recognition, pp. 678-686, 2016.
Nian Liu, Junwei Han, and Ming-Hsuan Yang. Picanet: Learning pixel-wise contextual attention for saliency detection. In Proceedings of the IEEE Conference on Computer Vision and Pattern Recognition, pp. 3089-3098, 2018.
Jonathan Long, Evan Shelhamer, and Trevor Darrell. Fully convolutional networks for semantic segmentation. In Proceedings of the IEEE conference on computer vision and pattern recognition, pp. 3431-3440, 2015.
Zhiming Luo, Akshaya Mishra, Andrew Achkar, Justin Eichel, Shaozi Li, and Pierre-Marc Jodoin. Non-local deep features for salient object detection. In Proceedings of the IEEE Conference on computer vision and pattern recognition, pp. 6609-6617, 2017.
Robert Osserman et al. The isoperimetric inequality. Bulletin of the American Mathematical Society, 84(6):1182-1238, 1978.
Youwei Pang, Xiaoqi Zhao, Lihe Zhang, and Huchuan Lu. Multi-scale interactive network for salient object detection. In Proceedings of the IEEE/CVF Conference on Computer Vision and Pattern Recognition, pp. 9413-9422, 2020.
Chao Peng, Xiangyu Zhang, Gang Yu, Guiming Luo, and Jian Sun. Large kernel matters-improve semantic segmentation by global convolutional network. In Proceedings of the IEEE conference on computer vision and pattern recognition, pp. 4353-4361, 2017.
Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.
Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.
Jianping Shi, Qiong Yan, Li Xu, and Jiaya Jia. Hierarchical image saliency detection on extended cssd. IEEE transactions on pattern analysis and machine intelligence, 38(4):717-729, 2015.
Karen Simonyan and Andrew Zisserman. Very deep convolutional networks for large-scale image recognition. arXiv preprint arXiv:1409.1556, 2014.
Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In Proceedings of the IEEE conference on computer vision and pattern recognition, pp. 1-9, 2015.
Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.
Lijun Wang, Huchuan Lu, Xiang Ruan, and Ming-Hsuan Yang. Deep networks for saliency detection via local estimation and global search. In Proceedings of the IEEE Conference on Computer Vision and Pattern Recognition, pp. 3183-3192, 2015.
Lijun Wang, Huchuan Lu, Yifan Wang, Mengyang Feng, Dong Wang, Baocai Yin, and Xiang Ruan. Learning to detect salient objects with image-level supervision. In Proceedings of the IEEE Conference on Computer Vision and Pattern Recognition, pp. 136-145, 2017.
Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.
Yichen Wei, Fang Wen, Wangjiang Zhu, and Jian Sun. Geodesic saliency using background priors. In European conference on computer vision, pp. 29-42. Springer, 2012.
Ning Xu, Brian Price, Scott Cohen, and Thomas Huang. Deep image matting. In Proceedings of the IEEE Conference on Computer Vision and Pattern Recognition, pp. 2970-2979, 2017.
Chuan Yang, Lihe Zhang, Huchuan Lu, Xiang Ruan, and Ming-Hsuan Yang. Saliency detection via graph-based manifold ranking. In Proceedings of the IEEE conference on computer vision and pattern recognition, pp. 3166-3173, 2013.
Yi Zeng, Pingping Zhang, Jianming Zhang, Zhe Lin, and Huchuan Lu. Towards high-resolution salient object detection. In Proceedings of the IEEE International Conference on Computer Vision, pp. 7234-7243, 2019.
Chi Zhang, Guosheng Lin, Fayao Liu, Rui Yao, and Chunhua Shen. Canet: Class-agnostic segmentation networks with iterative refinement and attentive few-shot learning. In Proceedings of the IEEE Conference on Computer Vision and Pattern Recognition, pp. 5217-5226, 2019.
Jianming Zhang and Stan Sclaroff. Saliency detection: A boolean map approach. In Proceedings of the IEEE international conference on computer vision, pp. 153-160, 2013.
Lihe Zhang, Jianwu Ai, Bowen Jiang, Huchuan Lu, and Xiukui Li. Saliency detection via absorbing markov chain with learnt transition probability. IEEE Transactions on Image Processing, 27(2):987-998, 2017.

(56) References Cited

OTHER PUBLICATIONS

Lu Zhang, Ju Dai, Huchuan Lu, You He, and Gang Wang. A bi-directional message passing model for salient object detection. In Proceedings of the IEEE Conference on Computer Vision and Pattern Recognition, pp. 1741-1750, 2018.

Lihe Zhang, Chuan Yang, Huchuan Lu, Xiang Ruan, and Ming-Hsuan Yang. Ranking saliency. IEEE transactions on pattern analysis and machine intelligence, 39(9):1892-1904, 2016.

Pingping Zhang, Dong Wang, Huchuan Lu, Hongyu Wang, and Xiang Ruan. Amulet: Aggregating multi-level convolutional features for salient object detection. In Proceedings of the IEEE International Conference on Computer Vision, pp. 202-211, 2017.

Xiaoning Zhang, Tiantian Wang, Jinqing Qi, Huchuan Lu, and Gang Wang. Progressive attention guided recurrent network for salient object detection. In Proceedings of the IEEE Conference on Computer Vision and Pattern Recognition, pp. 714-722, 2018.

Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.

Jia-Xing Zhao, Jiang-Jiang Liu, Deng-Ping Fan, Yang Cao, Jufeng Yang, and Ming-Ming Cheng. Egnet: Edge guidance network for salient object detection. In Proceedings of the IEEE International Conference on Computer Vision, pp. 8779-8788, 2019.

Rui Zhao, Wanli Ouyang, Hongsheng Li, and Xiaogang Wang. Saliency detection by multi-context deep learning. In Proceedings of the IEEE conference on computer vision and pattern recognition, pp. 1265-1274, 2015.

Shuai Zheng, Sadeep Jayasumana, Bernardino Romera-Paredes, Vibhav Vineet, Zhizhong Su, Dalong Du, Chang Huang, and Philip HS Torr. Conditional random fields as recurrent neural networks. In Proceedings of the IEEE international conference on computer vision, pp. 1529-1537, 2015.

Wangjiang Zhu, Shuang Liang, Yichen Wei, and Jian Sun. Saliency optimization from robust background detection. In Proceedings of the IEEE conference on computer vision and pattern recognition, pp. 2814-2821, 2014.

X. Bai and G. Sapiro. Geodesic matting: A framework for fast interactive image and video segmentation and matting. International Journal of Computer Vision, 82(2):113-132, 2008.

Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.

L.- C. Chen, G. Papandreou, I. Kokkinos, K. Murphy, and A. L. Yuille. Semantic image segmentation with deep convolutional nets and fully connected crfs. arXiv preprint arXiv:1412.7062, 2014.

R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.

L. Grady. Random walks for image segmentation. Pattern Analysis and Machine Intelligence, IEEE Transactions on, 28(11):1768-1783, 2006. Part 1.

L. Grady. Random walks for image segmentation. Pattern Analysis and Machine Intelligence, IEEE Transactions on, 28(11):1768-1783, 2006. Part 2.

V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.

G. Lin, C. Shen, I. Reid, et al. Efficient piecewise training of deep structured models for semantic segmentation. arXiv preprint arXiv:1504.01013, 2015.

Z. Liu, X. Li, P. Luo, C. C. Loy, and X. Tang. Semantic image segmentation via deep parsing network. arXiv preprint arXiv:1509.02634, 2015.

J. Long, E. Shelhamer, and T. Darrell. Fully convolutional networks for semantic segmentation. arXiv preprint arXiv:1411.4038, 2014.

B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.

C. Rother, V. Kolmogorov, and A. Blake. Grabcut: Interactive foreground extraction using iterated graph cuts. ACM Transactions on Graphics (TOG), 23(3):309-314, 2004.

S. Zheng, S. Jayasumana, B. Romera-Paredes, V. Vineet, Z. Su, D. Du, C. Huang, and P. Torr. Conditional random fields as recurrent neural networks. arXiv preprint arXiv:1502.03240, 2015.

Roth, H.—"DeepOrgan: Multi-level Deep Convolutional Networks for Automated Pancreas Segmentation"—Jun. 22, 2015—arXiv:1506.06448v1, pp. 1-12.

Wang, N.—"Transferring Rich Feature Hierarchies for Robust Visual Tracking"—Apr. 23, 2015—arXiv:1501.04587v2, pp. 1-9.

Farag, A.—"A Bottom-up Approach for Pancreas Segmentation using Cascaded Superpixels and (Deep) Image Patch Labeling"—May 22, 2015—Elsevier Journal of Medical Image Analysis, pp. 1-21.

D. Acuna, H. Ling, A. Kar, and S. Fidler. Efficient interactive annotation of segmentation datasets with Polygon-RNN++. In CVPR, 2018.

D. Batra, P. Yadollahpour, A. Guzman-Rivera, and G. Shakhnarovich. Diverse m-best solutions in markov random fields. In ECCV, 2012.

L. Castrejon, K. Kundu, R. Urtasun, and S. Fidler. Annotating object instances with a polygon-rnn. In IEEE CVPR, Jul. 2017.

L.- C. Chen, Y. Zhu, G. Papandreou, F. Schroff, and H. Adam. Encoder-decoder with atrous separable convolution for semantic image segmentation. arXiv preprint arXiv:1802.02611, 2018.

A. Criminisi, T. Sharp, and A. Blake. GeoS: Geodesic image segmentation. In ECCV, pp. 99-112, 2008.

M. Everingham, L. Van Gool, C. K. Williams, J. Winn, and A. Zisserman. The pascal visual object classes (VOC) challenge. IJCV, 88(2):303-338, 2010.

M. Firman, N. D. F. Campbell, L. Agapito, and G. J. Brostow. Diversenet: When one right answer is not enough. In IEEE CVPR, Jun. 2018.

D. Freedman and T. Zhang. Interactive graph cut based segmentation with shape priors. In IEEE CVPR, vol. 1, pp. 755-762. IEEE, 2005.

A. Guzman-rivera, D. Batra, and P. Kohli. Multiple choice learning: Learning to produce multiple structured outputs. In F. Pereira, C. J. C. Burges, L. Bottou, and K. Q. Weinberger, editors, NIPS, pp. 1799-1807. 2012.

B. Hariharan, P. Arbelaez, L. Bourdev, S. Maji, and J. Malik. Semantic contours from inverse detectors. 2011.

K. He, X. Zhang, S. Ren, and J. Sun. Deep residual learning for image recognition. In IEEE CVPR, Jun. 2016.

Y. Hu, A. Soltoggio, R. Lock, and S. Carter. A fully convolutional two-stream fusion network for interactive image segmentation. Neural Networks, 109:31-42, 2019.

M. Kass, A. Witkin, and D. Terzopoulos. Snakes: Active contour models. IJCV, 1(4):321-331, 1988.

H. Le, L. Mai, B. Price, S. Cohen, H. Jin, and F. Liu. Interactive boundary prediction for object selection. In ECCV, Sep. 2018.

S. Lee, S. Purushwalkam Shiva Prakash, M. Cogswell, D. Crandall, and D. Batra. Why M heads are better than one: Training a diverse ensemble of deep networks. CoRR, abs/1511.06314, 2015.

S. Lee, S. Purushwalkam Shiva Prakash, M. Cogswell, V. Ranjan, D. Crandall, and D. Batra. Stochastic multiple choice learning for training diverse deep ensembles. In D. D. Lee, M. Sugiyama, U. V. Luxburg, I. Guyon, and R. Garnett, editors, NIPS, pp. 2119-2127. 2016.

Y. Li, J. Sun, C.- K. Tang, and H.- Y. Shum. Lazy snapping. In ACM Transactions on Graphics, vol. 23, pp. 303-308, 2004.

Z. Li, Q. Chen, and V. Koltun. Interactive image segmentation with latent diversity. In IEEE CVPR, pp. 577-585, 2018.

J. H. Liew, Y. Wei, W. Xiong, S.- H. Ong, and J. Feng. Regional interactive image segmentation networks. In IEEE ICCV, Oct. 2017.

S. Mahadevan, P. Voigtlaender, and B. Leibe. Iteratively trained interactive segmentation. arXiv preprint arXiv:1805.04398, 2018.

(56) References Cited

OTHER PUBLICATIONS

K. Maninis, S. Caelles, J. Pont-Tuset, and L. Van Gool. Deep extreme cut: From extreme points to object segmentation. In IEEE CVPR, 2018.
K. McGuinness and N. E. OConnor. Toward automated evaluation of interactive segmentation. Computer Vision and Image Understanding, 115(6):868-884, 2011.
E. N. Mortensen and W. A. Barrett. Intelligent scissors for image composition. In Proceedings of the 22nd annual conference on Computer graphics and interactive techniques, pp. 191-198, 1995.
J. Redmon, S. Divvala, R. Girshick, and A. Farhadi. You only look once: Unified, real-time object detection. In Proceedings of the IEEE conference on computer vision and pattern recognition, pp. 779-788, 2016.
S. Ren, K. He, R. Girshick, and J. Sun. Faster r-cnn: Towards real-time object detection with region proposal networks. In Advances in neural information processing systems, pp. 91-99, 2015.
O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. IJCV, 115(3):211-252, 2015.
S. Vicente, V. Kolmogorov, and C. Rother. Graph cut based image segmentation with connectivity priors. In IEEE CVPR, pp. 1-8. IEEE, 2008.
N. Xu, B. Price, S. Cohen, J. Yang, and T. S. Huang. Deep interactive object selection. In IEEE CVPR, pp. 373-381, 2016.
K. Yamaguchi, M. H. Kiapour, L. E. Ortiz, and T. L. Berg. Parsing clothing in fashion photographs. In Computer Vision and Pattern Recognition (CVPR), 2012 IEEE Conference on, pp. 3570-3577. IEEE, 2012.
B. Zhou, H. Zhao, X. Puig, S. Fidler, A. Barriuso, and A. Torralba. Scene parsing through ade20k dataset. In Proceedings of the IEEE Conference on Computer Vision and Pattern Recognition, 2017.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405.0312v3 [cs.CV], 15 pages.
Gao Huang, Zhuang Liu, Kilian Q. Weinberger, and Laurens V.D. Maaten; "Densely connected convolutional networks," In arXiv:1608.06993v3, 2016.
C. Szegedy, W. Liu, Y.Q. Jia, P. Sermanet, S. Reed, D. Anguelov, D. Erhan, V. Vanhoucke, and A. Rabinovich; "Going deeper with convolutions," In CVPR , 2015.
Chen et al., 'DISC: Deep Image Saliency Computing via Progressive Representation Learning', 2016, IEEE Transactions on Neural Networks and Learning Systems, vol. 27, No. 6, pp. 1135-1149 (Year: 2016).
Control Theory and Informatics, vol. 2, No. 1, 2012 Digital Image Processing for Camera Application in Mobile Devices using Artificial Neural Networks, Kamat, S. P., pp. 11-17.
IEEE Conference on Computer Vision and Pattern Recognition (CVPR), 2016, Liang Chieh Chen et al., "Attention to Scale: Scale-Aware Semantic Image Segmentation", pp. 3640-3649 abstract 1. 7-9 and p. 2 left column, 1st paragraph starting at "In particular .. ", 1. 4-7, Sec. 3.1, Fig. 5 column (c).
IEEE/CVF International Conference on Computer Vision (ICCV), 2019, Liew Jun Hao et al, "MultiSeg: Semantically Meaningful, Scale-Diverse Segmentations From Minimal User Input", pp. 662-670 the whole document.
Chen, Liang-Chieh et al. "Rethinking Atrous Convolution for Semantic Image Segmentation." ArXiv abs/1706.05587 (2017): n. pag.
M. Rajchl et al., "DeepCut: Object Segmentation From Bounding Box Annotations Using Convolutional Neural Networks," in IEEE Transactions on Medical Imaging, vol. 36, No. 2, pp. 674-683, Feb. 2017, archived at arxiv.org/pdf/1605.07866.
Combined Search and Examination Report as received in UK application GB1915436.8 dated Aug. 12, 2020.
Combined Search & Examination Report as received in UK application GB1813276.1 dated Feb. 14, 2019.
Zhang et al. in U.S. Appl. No. 16/988,055, filed Aug. 7, 2020, entitled Generating an Image Mask for a Digital Image By Utilizing a Multi-Branch Masking Pipeline With Neural Networks.
U.S. Appl. No. 14/945,245, Sep. 21, 2017, Preinterview 1st Office Action.
U.S. Appl. No. 14/945,245, Nov. 1, 2017, 1st Action Office Action.
U.S. Appl. No. 14/945,245, Apr. 17, 2018, Office Action.
U.S. Appl. No. 14/945,245, Sep. 12, 2018, Notice of Allowance.
U.S. Appl. No. 16/216,739, Feb. 25, 2021, Preinterview 1st Office Action.
U.S. Appl. No. 16/216,739, Apr. 5, 2021, 1st Action Office Action.
U.S. Appl. No. 15/799,395, Mar. 14, 2019, Office Action.
U.S. Appl. No. 15/799,395, Jul. 12, 2019, Notice of Allowance.
U.S. Appl. No. 15/967,928, Dec. 10, 2020, Preinterview 1st Office Action.
U.S. Appl. No. 16/231,746, Feb. 18, 2021, Preinterview 1st Office Action.
U.S. Appl. No. 15/967,928, Apr. 2, 2021, 1st Action Office Action.
U.S. Appl. No. 15/967,928, May 13, 2021, Office Action.
U.S. Appl. No. 16/376,704, Jun. 14, 2022, Office Action.
U.S. Appl. No. 17/126,986, Aug. 30, 2022, Office Action.
U.S. Appl. No. 16/376,704, Oct. 4, 2022, Notice of Allowance.
U.S. Appl. No. 17/660,361, Dec. 8, 2022, Office Action.
Guo, Z.—"Deep Learning-Based Image Segmentation on Multimodal Medical Imaging"—IEEE—Mar. 1, 2019—pp. 162-169 ( Year: 2019).
Wang, G.—"Interactive Medical Image Segmentation using Deep Learning with Image-specific Fine-tuning"—arXiv—Oct. 11, 2017—pp. 1-11 (Year: 2017).
Guo, Z.—"Medical Image Segmentation Based on Multi-Modal Convolutional Neural Network: Study on Image Fusion Schemes"—arXiv—Nov. 2, 2017—pp. 1-10 (Year: 2017).
U.S. Appl. No. 16/216,739, Dec. 23, 2021, Notice of Allowance.
U.S. Appl. No. 16/988,408, Jan. 5, 2022, Notice of Allowance.
U.S. Appl. No. 16/376,704, Dec. 29, 2021, Preinterview 1st Office Action.
U.S. Appl. No. 16/376,704, Feb. 7, 2022, 1st Action Office Action.
Examination Report as received in Australian application 2019250107 dated Oct. 14, 2021.
U.S. Appl. No. 15/967,928, Sep. 29, 2021, Notice of Allowance.
U.S. Appl. No. 16/988,408, Oct. 5, 2021, Preinterview 1st Office Action.
Notice of Grant as received in Australian application 2019250107 dated Mar. 17, 2022.
Examination Report as received in Australian application 2019250107 dated Nov. 5, 2021.
Notice of Grant as received in UK application GB1813276.1 dated Oct. 12, 2021.
U.S. Appl. No. 16/231,746, Nov. 10, 2021, Notice of Allowance.
U.S. Appl. No. 16/988,408, Nov. 24, 2021, 1st Action Office Action.
U.S. Appl. No. 17/126,986, Jan. 17, 2023, Notice of Allowance.
U.S. Appl. No. 17/660,361, Mar. 28, 2023, Notice of Allowance.
Office Action as received in CN application 201810886944.1 dated Apr. 8, 2023.
He et al. in Guided Image Filtering, IEEE Transactions on Pattern Analysis and Machine Intelligence, vol. 35, 2013.
He et al. in Fast Guided Filter, Computer Vision and Pattern Recognition, arXiv:1505.00996, 2015.
Ning Xu et al., "Deep GrabCut for Object Selection," published Jul. 14, 2017.
Yang et al., Meticulous Object Segmentation, Dec. 13, 2020, available at https://arxiv.org/pdf/2012.07181.pdf.

* cited by examiner

| Method | MAE↓ | S-m↑ | IoU↑ | mBA↑ | MQ↑ |
|---|---|---|---|---|---|
| EGNet | 4.05 | 89.47 | 80.19 | 66.18 | 81.51 |
| MINet | 3.58 | 89.59 | 80.49 | 64.82 | 80.96 |
| MeticulousNet_L | 3.46 | 89.75 | 80.59 | 66.09 | 81.74 |

Fig. 10A

| Method | MAE↓ | S-m↑ | IoU↑ | mBA↑ | MQ↑ |
|---|---|---|---|---|---|
| EGNet | 6.89 | 82.21 | 70.50 | 60.54 | 77.83 |
| MINet | 6.55 | 81.94 | 69.94 | 59.30 | 77.27 |
| MeticulousNet_L | 6.40 | 83.38 | 72.18 | 60.72 | 78.16 |

Fig. 10B

| Dataset | HRSOD | | | | | MOS600 | | | | |
|---|---|---|---|---|---|---|---|---|---|---|
| Method | MAE↓ | S-m↑ | IoU↑ | mBA↑ | MQ↑ | MAE↓ | S-m↑ | IoU↑ | mBA↑ | MQ↑ |
| EGNet | 4.06 | 89.39 | 80.10 | 64.76 | 80.91 | 7.04 | 81.87 | 69.99 | 61.25 | 78.76 |
| MiNet | 3.61 | 89.57 | 80.41 | 63.85 | 80.59 | 6.70 | 81.69 | 69.59 | 60.13 | 78.33 |
| GSN+APS+LRN+GLFN | 2.98 | 89.67 | 80.40 | 62.26 | 80.11 | — | — | — | — | — |
| EGNet + cascadePSP | 3.56 | 89.34 | 81.70 | 72.32 | 84.66 | 5.88 | 82.59 | 73.12 | 67.67 | 82.04 |
| MiNet + cascadePSP | 2.98 | 89.67 | 82.64 | 72.32 | 84.82 | 5.70 | 83.00 | 73.47 | 67.25 | 81.99 |
| EGNet + cascadePSP* | 3.51 | 89.29 | 81.66 | 72.41 | 84.72 | 5.56 | 83.58 | 74.69 | 70.27 | 83.40 |
| MiNet + cascadePSP* | 3.23 | 89.98 | 82.76 | 72.56 | 84.94 | 5.34 | 84.13 | 75.19 | 69.96 | 83.40 |
| MeticulousNet_(L+H) | 2.97 | 90.00 | 82.56 | 73.64 | 85.59 | 5.08 | 85.08 | 76.43 | 72.09 | 84.46 |

Extracting Encoded Feature Maps From A Digital Visual Media Item *1402*

Generating Decoded Feature Maps Based On The Encoded Feature Maps *1404*

Generating A Refined Segmentation Mask Based On The Encoded Feature Maps And Thr Decoded Feature Maps *1406*

GENERATING REFINED SEGMENTATIONS MASKS VIA METICULOUS OBJECT SEGMENTATION

BACKGROUND

Recent years have seen a significant advancement in hardware and software platforms for editing digital visual media items (e.g., digital photos, digital videos, digital video feeds). Indeed, as devices capable of generating and displaying/sharing digital visual media have become more prevalent, so have systems for enhancing digital visual media items using various digital editing techniques. For example, many conventional systems generate a segmentation mask to distinguish between various portions of a digital visual media item (e.g., distinguish a displayed object from a background). Many such conventional systems use segmentation masks to apply various filters or effects to a desired portion of the digital visual media item. Although conventional segmentation systems can generate segmentation masks for digital visual media items, such systems are often inflexibly limited to low-resolutions, are often inaccurate at segmenting fine-grained details in high-resolution images, and often require extensive memory and computing resources to process high-resolution images.

SUMMARY

One or more embodiments described herein provide benefits and/or solve one or more problems in the art with systems, methods, and non-transitory computer-readable media that flexibly generate accurate, refined segmentation masks for high-resolution digital visual media via meticulous object segmentation. For example, in one or more embodiments, a system utilizes a neural network having a recursive decoder designed for segmenting well-defined foreground objects with elaborate shapes in high-resolution digital images (e.g., digital images having a resolution between 2K and 4K) or other high-resolution digital visual media items. In particular, in some implementations, the system utilizes a recursive decoder that includes a deconvolution branch and a refinement branch that includes a hierarchy of hierarchical point-wise refining blocks within the decoder layers to delineate the object boundaries. In some embodiments, the system implements the neural network as part of a framework pipeline consisting of a low-resolution segmentation model and a high-resolution refinement model. In particular, the system utilizes the same network architecture to perform low-resolution object segmentation and high-resolution mask refinement. In this manner, the system flexibly adapts object segmentation to generate accurate segmentation masks for high-resolution digital visual media items.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 10A-10B illustrate tables reflecting experimental results regarding the effectiveness of the meticulous segmentation system in accordance with one or more embodiments;

FIG. 11 illustrates another table reflecting additional experimental results regarding the effectiveness of the meticulous segmentation system in accordance with one or more embodiments;

DETAILED DESCRIPTION

Figure 1:
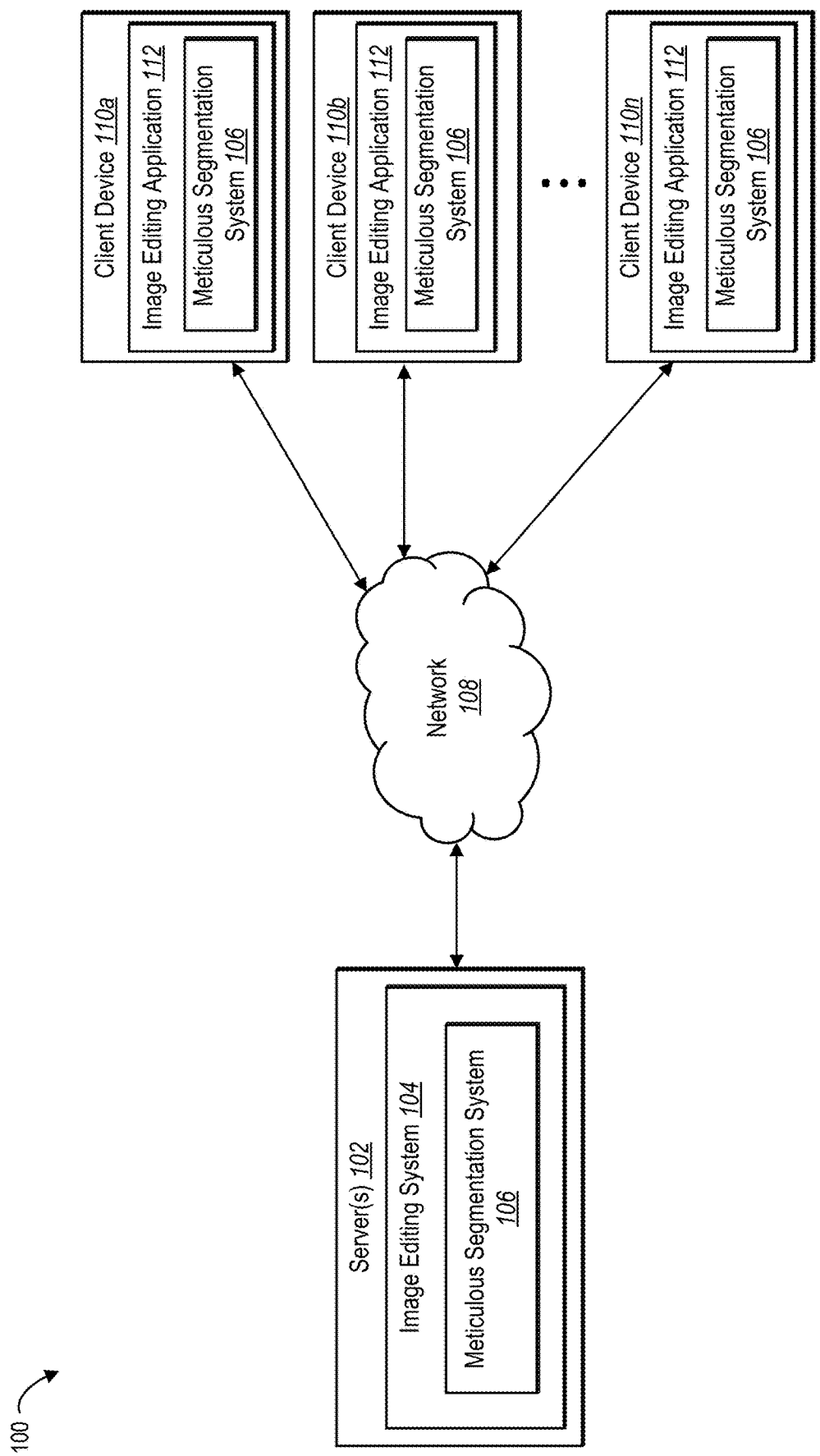
FIG. 1 illustrates an example environment in which a meticulous segmentation system can operate in accordance with one or more embodiments.

One or more embodiments described herein include a meticulous segmentation system that utilizes a neural network that includes a recursive decoder for flexible and accurate object segmentation. Indeed, in one or more embodiments, the meticulous segmentation system generates a refined segmentation mask for a digital image (or other digital visual media item) using a neural network having a recursive decoder that incorporates hierarchical local refinements and recursive global refinements under an internal unsupervised spatial guidance. In particular, in some cases, the recursive decoder integrates recursive mask-wise global refinements coupled with a hierarchy of local modules (e.g., hierarchical point-wise refining blocks) to iteratively improve the quality of segmentation masks in higher resolutions. In some instances, the neural network includes a low-resolution segmentation model and a high-resolution refinement model. For example, in some cases, the meticulous segmentation system utilizes the low-resolution model to generate a low-resolution segmentation mask for a low-resolution copy of a digital image and further utilizes the high-resolution model to recover mask details in the original resolution of the digital image.

To provide an illustration, in one or more embodiments, the meticulous segmentation system generates, utilizing a segmentation refinement neural network, a refined segmentation mask for a digital visual media item depicting one or more objects. For example, the meticulous segmentation system utilizes an encoder to extract encoded feature maps from the digital visual media item. Further, the meticulous segmentation system utilizes a deconvolution branch of a recursive decoder to generate decoded feature maps based on the encoded feature maps. The meticulous segmentation system also utilizes a hierarchy of hierarchical point-wise refining blocks corresponding to a refinement branch of the recursive decoder to generate the refined segmentation mask by recursively refining an initial segmentation mask corresponding to the digital visual media item based on the encoded feature maps and the decoded feature maps.

As just mentioned, in one or more embodiments, the meticulous segmentation system utilizes a segmentation refinement neural network to generate a refined segmentation mask for a digital visual media item that displays one or more objects. For example, in some implementations, the meticulous segmentation system utilizes a segmentation refinement neural network having an encoder-decoder network architecture. To illustrate, in some instances, the segmentation refinement neural network includes an encoder and a recursive decoder. Accordingly, the meticulous segmentation system utilizes the encoder to generate various encoded feature maps corresponding to the digital visual media item and utilizes the recursive decoder to generate the refined segmentation mask based on the encoded feature maps.

In some implementations, the recursive decoder includes a deconvolution branch and a refinement branch. In some cases, the meticulous segmentation system utilizes the deconvolution branch to generate one or more decoded feature maps corresponding to the digital visual media item based on the encoded feature maps. Further, the meticulous segmentation system utilizes the refinement branch to generate a refined segmentation mask for the digital visual media item based on the decoded feature maps and the encoded feature maps. For example, in some implementations, the meticulous segmentation system generates an initial segmentation mask and recursively refines the initial segmentation mask using the refinement branch.

In some embodiments, the refinement branch generates the refined segmentation mask via a hierarchy of hierarchical point-wise refining blocks. To illustrate, in some cases, the meticulous segmentation system utilizes a first hierarchical point-wise refining block to generate the initial segmentation mask for the digital visual media object. The meticulous segmentation system further utilizes a plurality of additional hierarchical point-wise refining blocks to generate the refined segmentation mask by recursively refining the initial segmentation mask. In some cases, the additional hierarchical point-wise refining blocks make up a multi-cycle up-sampling process that up-samples the initial segmentation mask while refining the initial segmentation mask.

In some implementations, the meticulous segmentation system utilizes each hierarchical point-wise refining block to generate an uncertainty map that identifies pixels having an associated uncertainty whether or not the pixels correspond to the one or more objects portrayed in the digital visual media item. In such embodiments, the meticulous segmentation system utilizes each hierarchical point-wise refining block to generate the initial segmentation mask or refine the initial segmentation mask based on the respective uncertainty map by refining the uncertain areas of the segmentation mask. The uncertainty map provides guidance to the areas of a segmentation map to be refined. Thus, by utilizing the uncertainty map, the meticulous segmentation system limits computational costs by avoiding the refinement of every pixel/location of a segmentation map.

As further mentioned above, in one or more embodiments, the segmentation refinement neural network includes a low-resolution segmentation network and a high-resolution refinement network. For example, in some cases, the meticulous segmentation system utilizes the low-resolution segmentation network to generate a low-resolution segmentation mask based on a low-resolution copy of the digital visual media item. Further, in some instances, the meticulous segmentation system utilizes the high-resolution refinement network to generate a high-resolution segmentation mask based on the low-resolution segmentation mask. In one or more embodiments, the low-resolution segmentation network and the high-resolution refinement network include the same network architecture. For example, in some cases, the low-resolution segmentation network and the high-resolution refinement network each include an encoder-decoder network architecture having a recursive decoder with a deconvolution branch and a refinement branch.

In one or more embodiments, the meticulous segmentation system utilizes the refined segmentation mask to modify the digital visual media item. For example, in some implementations, the meticulous segmentation system applies a filter or a digital effect to the digital visual media item based on the refined segmentation mask. In alternative implementations, the meticulous segmentation system utilizes the refined segmentation mask to generate a composite digital image that combines one or more objects segmented by the refined segmentation mask with another digital image.

As mentioned above, conventional segmentation systems suffer from several technological shortcomings that result in inflexible and inaccurate operation. For example, many conventional segmentation systems are rigidly limited to segmenting the foregrounds of low-resolution digital visual media items (e.g., digital visual media items having a resolution below 2K). Indeed, conventional segmentation systems typically implement segmentation models that focus on low-resolution digital visual media items where fine-grained details constituting object boundaries are not well represented due to the insufficient number of pixels. Accordingly, such details are often rigidly ignored (e.g., not accounted for) by the implemented models, and the conventional systems fail to flexibly adapt to digital visual media items having a relatively higher resolution (e.g., a resolution between 2K and 4K) where such details are better represented.

Further, conventional segmentation systems can also operate inaccurately. In particular, because conventional systems typically implement models that are not designed to perform segmentation of high-resolution fine-grained details, such systems often fail to generate accurate segmentation masks for high-resolution images including such fine-grained details. For example, as the resolution of a digital visual media item increases, the higher number of pixels reveals the finer details of hard-to-see, complex object boundaries, such as those associated with animal fur, human hairs, insect antennae, flower stamens, cavities inside jewelry, etc. As the segmentation models implemented by conventional systems typically fail to account for finer details, these systems often fail to generate segmentation masks that accurately capture the boundaries of such objects.

The meticulous segmentation system provides several advantages over conventional systems. For example, the meticulous segmentation system operates more flexibly than conventional systems. In particular, the meticulous segmentation system flexibly adapts to generate refined segmentation masks for high-resolution digital visual media items (e.g., digital visual media items having a resolution between 2K and 4K). For example, by utilizing a recursive decoder that includes a deconvolution branch and a refinement branch having a hierarchy of hierarchical point-wise refining blocks, the meticulous segmentation system flexibly improves upon the level of detail represented in segmentation masks generated for digital visual media items. Similarly, by utilizing a segmentation refinement neural network having a low-resolution segmentation network and a high-resolution refinement network, the meticulous segmentation system flexibly provides greater detail. Accordingly, the meticulous segmentation system generates refined segmentation masks having a high resolution (e.g., the original resolution associated with the digital visual media item).

Additionally, the meticulous segmentation system improves the accuracy of segmentation masks generated for digital visual media items—particularly those digital visual media items having a high resolution. Indeed, by improving the level of detail represented within generated segmentation masks, the meticulous segmentation system generates segmentation masks (e.g., refined segmentation masks) that more accurately distinguish an object portrayed in a digital visual media item from a background. Accordingly, the meticulous segmentation system generates more accurate segmentation masks for high-resolution digital visual media items where fine-grained details associated with complex object boundaries are more apparent.

Additional detail regarding the meticulous segmentation system will now be provided with reference to the figures. For example, FIG. 1 illustrates a schematic diagram of an exemplary system 100 in which a meticulous segmentation system 106 can operate. As illustrated in FIG. 1, the system 100 includes a server(s) 102, a network 108, and client devices 110a-110n.

Although the system 100 of FIG. 1 is depicted as having a particular number of components, the system 100 can have any number of additional or alternative components (e.g., any number of servers, client devices, or other components in communication with the meticulous segmentation system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 15). Moreover, the server(s) 102 and the client devices 110a-110n include computing devices such as those discussed in greater detail with relation to FIG. 15.

As mentioned above, the system 100 includes the server(s) 102. In one or more embodiments, the server(s) 102 generates, stores, receives, and/or transmits data including digital visual media items, segmentation masks, and modified digital visual media items. For example, in some embodiments, the server(s) 102 receives a digital visual media item from a client device (e.g., one of the client devices 110a-110n) and transmits a segmentation mask or modified digital visual media item to the client device. In one or more embodiments, the server(s) 102 comprises a data server. In some implementations, the server(s) 102 comprises a communication server or a web-hosting server.

As shown in FIG. 1, the server(s) 102 includes an image editing system 104. In one or more embodiments, the image editing system 104 provides functionality by which a user (e.g., a user of one of the client devices 110a-110n) generates, edits, manages, and/or stores digital visual media items. For example, in some instances, a user utilizes a client device to send a digital visual media item to the image editing system 104 hosted on the server(s) 102 via the network 108. The image editing system 104 then provides many options that the user may use to edit the digital visual media item, store the digital visual media item, and subsequently search for, access, and view the digital visual media item.

Additionally, the server(s) 102 include the meticulous segmentation system 106. In particular, in one or more embodiments, the meticulous segmentation system 106 utilizes the server(s) 102 to generate refined segmentation masks for digital visual media items. For example, the meticulous segmentation system 106 can utilize the server(s) 102 to identify a digital visual media item and generate a refined segmentation mask for the digital visual media item.

To illustrate, in one or more embodiments, the meticulous segmentation system 106, via the server(s) 102, generates a refined segmentation mask for a digital visual media item depicting one or more objects utilizing a segmentation refinement neural network. For example, via the server(s) 102, the meticulous segmentation system 106 extracts encoded feature maps from the digital visual media item utilizing an encoder. Via the server(s) 102, the meticulous segmentation system 106 further generates decoded feature maps based on the encoded feature maps utilizing a deconvolution layer of a recursive decoder. Utilizing a hierarchy of point-wise refining blocks of the recursive decoder, and via the server(s) 102, the meticulous segmentation system 106 generates the refined segmentation mask by recursively refining an initial segmentation mask corresponding to the digital visual media item based on the encoded feature maps and the decoded feature maps.

In one or more embodiments, the client devices 110a-110n include computing devices that can access, edit, store, and/or provide, for display, digital visual media items. For example, the client devices 110a-110n can include smartphones, tablets, desktop computers, laptop computers, head-mounted-display devices, or other electronic devices. The client devices 110a-110n include one or more applications (e.g., the image editing application 112) that can access, edit, segment, modify, store, and/or provide, for display, digital visual media items. For example, in one or more embodiments, the image editing application 112 includes a software application installed on the client devices 110a-110n. Additionally, or alternatively, the image editing application 112 includes a software application hosted on the server(s) 102 (and supported by the image editing system 104), which may be accessed by the client devices 110a-110n through another application, such as a web browser.

In particular, in some implementations, the meticulous segmentation system 106 on the server(s) 102 supports the meticulous segmentation system 106 on the client device 110n. For instance, the meticulous segmentation system 106 learns parameters for the segmentation refinement neural network. The meticulous segmentation system 106 then provides the segmentation refinement neural network to the client device 110n. In other words, the client device 110n obtains (e.g., downloads) the segmentation refinement neural network with the learned parameters from the server(s) 102. Once downloaded, the meticulous segmentation system 106 on the client device 110n can utilize the segmentation refinement neural network to generate segmentation masks independent from the server(s) 102.

In alternative implementations, the meticulous segmentation system 106 includes a web hosting application that allows the client device 110n to interact with content and services hosted on the server(s) 102. To illustrate, in one or more implementations, the client device 110n accesses a web page via the supported by the server(s) 102. For example, the client device 110n provides a digital image to the server(s) 102, and, in response, the meticulous segmentation system 106 on the server(s) 102 generates a segmentation mask. The server(s) 102 then provides the segmentation to the client device 110n for display or editing of the digital image.

Indeed, the meticulous segmentation system 106 can be implemented in whole, or in part, by the individual elements of the system 100. Indeed, although FIG. 1 illustrates the meticulous segmentation system 106 implemented with regard to the server(s) 102, different components of the meticulous segmentation system 106 can be implemented by a variety of devices within the system 100. For example, one or more (or all) components of the meticulous segmentation system 106 can be implemented by a different computing device (e.g., one of the client devices 110a-110n) or a separate server from the server(s) 102 hosting the image editing system 104. Indeed, as shown in FIG. 1, the client devices 110a-110n include the meticulous segmentation system 106. Example components of the meticulous segmentation system 106 will be described below with regard to FIG. 13.

Figure 2:
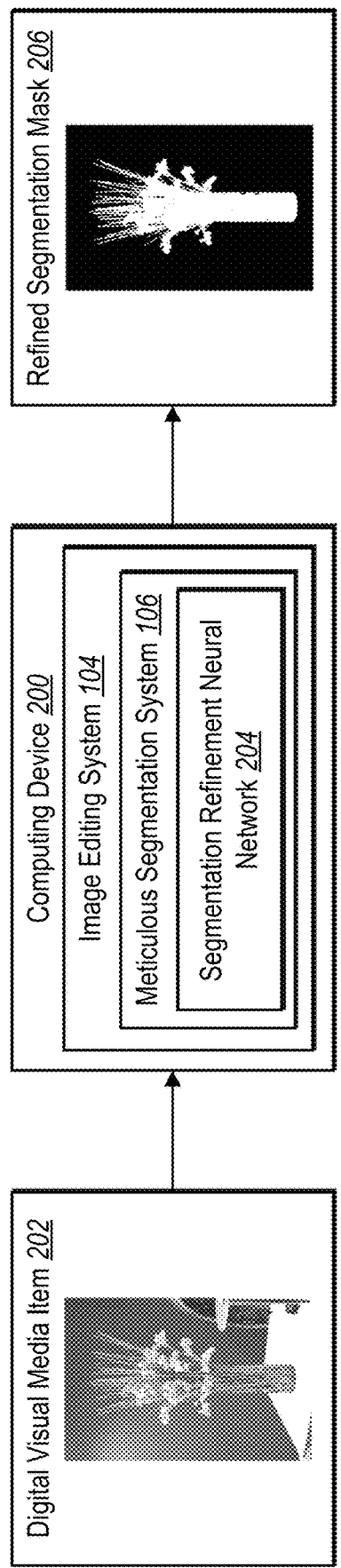
FIG. 2 illustrates an overview diagram of the meticulous segmentation system generating a refined segmentation mask for a digital visual media item in accordance with one or more embodiments.

As mentioned above, in one or more embodiments, the meticulous segmentation system 106 generates refined segmentation masks for digital visual media items. FIG. 2 illustrates an overview diagram of the meticulous segmentation system 106 generating a refined segmentation mask for a digital visual media item in accordance with one or more embodiments. As shown in FIG. 2, the meticulous segmentation system 106 determines (e.g., identifies) a digital visual media item 202. In one or more embodiments, a digital visual media item includes any digital item capable of producing a visual representation. In particular, in some embodiments, a digital visual media item includes a previously-captured digital item, such as a previously-captured digital image (e.g., a digital photo or other digitally-created image) or digital video. In some embodiments, a digital visual media item includes to a digital video or other camera feed. Further, in some instances, a digital video media item includes a video frame of a previously-captured digital video or a video frame of a digital video feed.

In one or more embodiments, a digital visual media item depicts one or more objects (e.g., as shown by the digital visual media item 202). In one or more embodiments, an object includes a distinguishable element depicted in a digital visual media item. For example, in some embodiments, an object includes a person, an item, a natural object (e.g., a tree or rock formation) or a structure depicted in a digital visual media item. In some instances, an object includes a plurality of elements that, collectively, can be distinguished from other elements depicted in a digital visual media item. For example, in some instances, an object includes a collection of buildings that make up a skyline. In some instances, an object more broadly includes a foreground or other element(s) depicted in a digital visual media item as distinguished from a background.

In one or more embodiments, the meticulous segmentation system 106 determines (e.g., identifies) the digital visual media item 202 by receiving the digital visual media item 202 from a computing device (e.g., a third-party system or a client device) or receiving user input identifying the digital visual media item 202 for segmentation. In some embodiments, however, the meticulous segmentation system 106 determines the digital visual media item 202 by accessing a database storing digital visual media items. For example, in at least one implementation, the meticulous segmentation system 106 maintains a database and stores a plurality of digital visual media items therein. In some instances, an external device or system stores digital visual media items for access by the meticulous segmentation system 106.

As discussed above, and as shown in FIG. 2, in some instances, the meticulous segmentation system 106 operates on a computing device 200 (e.g., the server(s) 102 or one of the client devices 110a-110n discussed above with reference to FIG. 1 or some other mobile computing device, such as smart phone or tablet). Accordingly, in some embodiments, the meticulous segmentation system 106 identifies the digital visual media item 202 by accessing the digital visual media item 202 from local storage, detecting that the computing device 200 has captured the digital visual media item 202, or by determining that the computing device 200 has activated a camera to capture the digital visual media item 202 (e.g., is capturing a digital video feed or is setup to capture a digital photo).

As shown in FIG. 2, the meticulous segmentation system 106 utilizes a segmentation refinement neural network 204 to analyze the digital visual media item 202. Generally, in one or more embodiments, a neural network includes a machine learning model that can be tuned (e.g., trained) based on inputs to approximate unknown functions used for generating the corresponding outputs. Indeed, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

More particularly, in one or more embodiments, a segmentation refinement neural network includes a computer-implemented neural network that generates refined segmentation masks for digital visual media items. Indeed, in some embodiments, a segmentation refinement neural network includes a neural network that analyzes a digital visual media item, generates an initial segmentation mask for the digital visual media item, and generates one or more refined segmentation masks based on the initial segmentation mask. For example, in one or more embodiments, a segmentation refinement neural network includes a neural network composed of an encoder-decoder network architecture.

For instance, in some implementations, the segmentation refinement neural network 204 includes an encoder and a recursive decoder. In some cases, the recursive decoder includes a deconvolution branch and a refinement branch having a hierarchy of hierarchical point-wise refining blocks. In some instances, the segmentation refinement neural network includes a low-resolution network and high-resolution network, each including an encoder and a recursive decoder. The architecture of the segmentation refinement neural network 204 will be discussed in more detail below.

As shown in FIG. 2, based on the analysis of the digital visual media item 202 by the segmentation refinement neural network 204, the meticulous segmentation system 106 generates a refined segmentation mask 206. For example, in some implementations, the meticulous segmentation system 106 utilizes the segmentation refinement neural network 204 to generate an initial segmentation mask and then recursively refine the initial segmentation mask to generate the refined segmentation mask 206.

In one or more embodiments, a segmentation mask generally includes an identification of pixels in a digital visual media item that represent an object. In particular, in some embodiments, a segmentation mask includes a filter useful for partitioning a digital visual media item into separate portions. For example, in some cases, a segmentation mask includes a filter that corresponds to a digital visual media item and identifies a portion of the digital visual media item (i.e., pixels of the digital visual media item) belonging to one or more objects and a portion of the digital visual media item belonging to a background. For example, in some embodiments, a segmentation mask includes a map of a digital visual media item that has an indication for each pixel of whether the pixel corresponds to part of an object or not. In some implementations, the indication includes a binary indication (a 1 for pixels belonging to the object and a zero for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa. In one or more embodiments, a segmentation mask has a resolution that differs from the resolution of the corresponding digital visual media item.

Relatedly, in one or more embodiments an initial segmentation mask includes a segmentation mask generated directly from the corresponding digital visual media item. For example, in some embodiments an initial segmentation mask includes a first segmentation mask generated by a segmentation refinement neural network based on the corresponding digital visual media item.

Also, in one or more embodiments, a refined segmentation mask includes a segmentation mask generated based on another segmentation mask, such as an initial segmentation mask or a preceding refined segmentation mask. In particular, in some instances, a refined segmentation mask includes a segmentation mask having pixels that have been re-analyzed or re-classified to indicate whether or not those pixels belong to an object portrayed in the digital visual media item. For example, in some implementations, a refined segmentation mask includes a segmentation mask having one or more pixels that were indicated, in a previous segmentation mask, as being uncertain as to whether or not they belong to an object but have since been determined to belong or not belong to an object with a greater certainty.

Though not shown in FIG. 2, in one or more embodiments, the meticulous segmentation system 106 modifies the digital visual media item 202 based on the refined segmentation mask 206. For example, in some cases, the meticulous segmentation system 106 replaces a background portrayed in the digital visual media item 202. In some cases, the meticulous segmentation system 106 applies a filter to the digital visual media item 202 (e.g., applies a filter a background or to one or more objects portrayed in the digital visual media item 202). In some instances, the meticulous segmentation system 106 applies a digital effect to the digital visual media item 202. In still further implementations, the meticulous segmentation system 106 composites the segmented object into another digital image.

Figure 3:
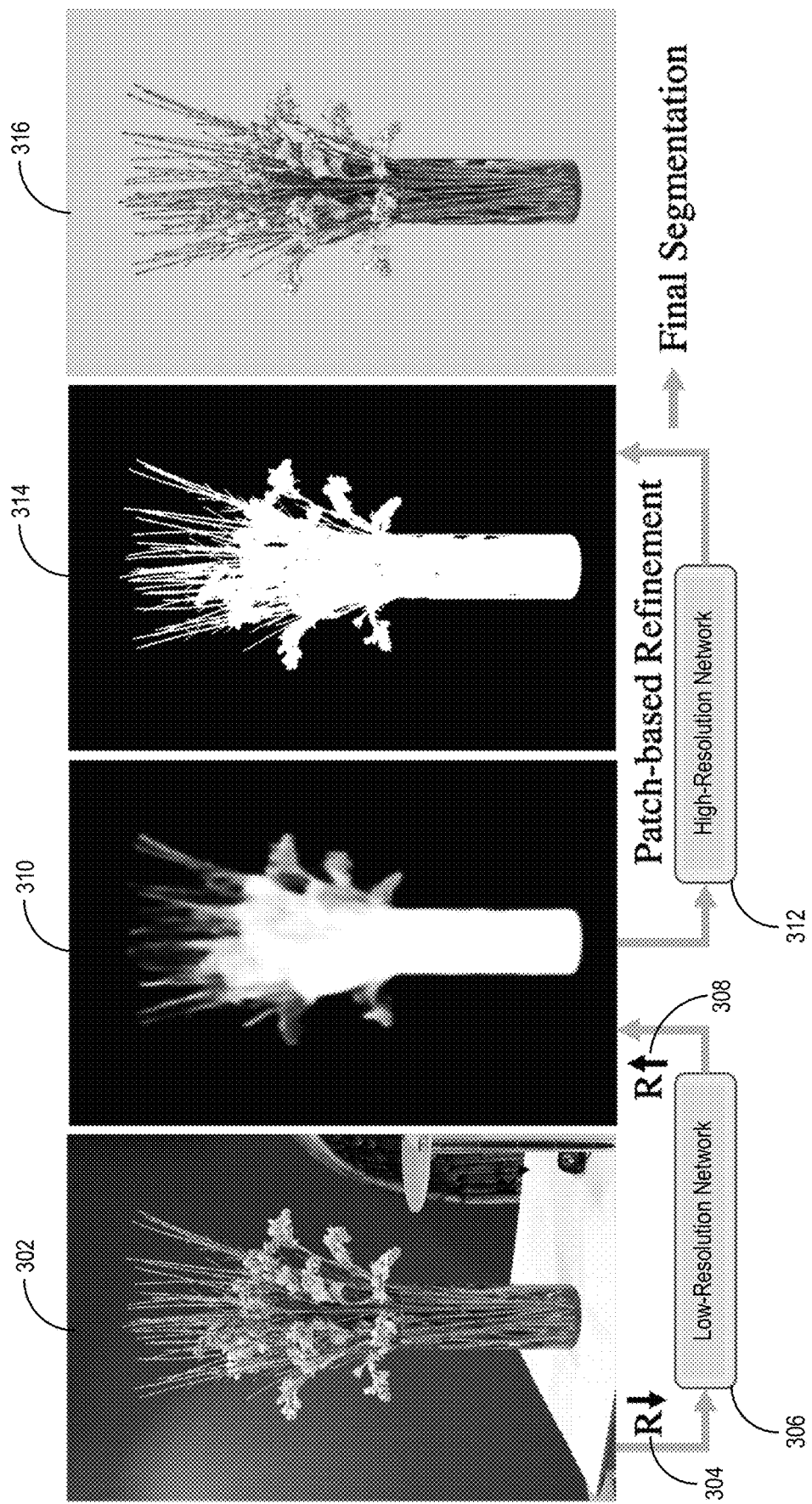
FIG. 3 illustrates utilizing a segmentation refinement neural network that includes a low-resolution network and a high-resolution network to generate a refined segmentation mask for a digital visual media item in accordance with one or more embodiments.

As mentioned above, in one or more embodiments, the meticulous segmentation system 106 utilizes a segmentation refinement neural network that includes a low-resolution network and a high-resolution network to generate a refined segmentation mask for a digital visual media item. FIG. 3 illustrates utilizing a segmentation refinement neural network that includes a low-resolution network and a high-resolution network to generate a refined segmentation mask for a digital visual media item in accordance with one or more embodiments.

As shown in FIG. 3, the meticulous segmentation system 106 determines (e.g., identifies) the digital visual media item 302. Further, as illustrated, the digital visual media item 302 depicts an object (e.g., a vase containing flowers). As will be explained, in one or more embodiments, the meticulous segmentation system 106 generates a refined segmentation mask to distinguish the object depicted in the digital visual media item 302 from the background depicted in the digital visual media item 302.

Additionally, as shown in FIG. 3, the meticulous segmentation system 106 accesses a low-resolution copy of the digital visual media item 302 (as shown by the indicator 304 indicating a reduction in resolution). For example, in some embodiments, the meticulous segmentation system 106 generates a copy of the digital visual media item 302 that includes a resolution that is lower than the resolution of the digital visual media item 302.

In one or more embodiments, a resolution includes a number of pixels. In particular, in some embodiments, a resolution includes the number of pixels depicted in a digital visual media item or a corresponding segmentation mask. In one or more embodiments, a relatively higher resolution corresponds to a relatively greater degree of detail reflected in the digital visual media item or segmentation mask, especially with regard to fine or complex details (e.g., hair, fur, textures, etc.). In some implementations, a high resolution includes a resolution at 2K (e.g., 2560×1440 pixels) or above. Accordingly, in some cases, a low resolution includes a resolution below 2K. It should be understood, however, that in many instances, the terms "low" and "high" are relative so that a high resolution includes a resolution having a greater number of pixels than another resolution and, similarly, a low resolution includes a resolution having a lower number of pixels than another resolution. To illustrate, in one or more embodiments, the digital visual media item 302 includes a resolution at or above 2K, and the meticulous segmentation system 106 generates a low-resolution copy of the digital visual media item 302 by generating a digital copy of the digital visual media item 302 having a resolution below 2K.

As indicated, a resolution corresponds to a number of pixels. In one or more embodiments, a pixel includes a unit of a digital visual media item or a segmentation mask. In particular, in some embodiments, a pixel includes a smallest distinguishable element of a digital visual media item or a segmentation mask. Indeed, as suggested above, in some cases, a digital visual media item or a segmentation mask includes a plurality of pixels that collectively correspond to one or more portions of the digital visual media item or the segmentation mask, respectively.

As shown in FIG. 3, the meticulous segmentation system 106 provides the low-resolution copy of the digital visual media item 302 to the low-resolution network 306. In one or more embodiments, the meticulous segmentation system 106 utilizes the low-resolution network 306 to generate a low-resolution segmentation mask (not shown) based on the low-resolution copy of the digital visual media item 302. In one or more embodiments, the low-resolution segmentation mask includes a segmentation mask that corresponds to the digital visual media item 302 but has a resolution that is lower than the resolution of the digital visual media item 302 (e.g., the original resolution). For example, in some implementations, the low-resolution segmentation mask includes the same resolution as the low-resolution copy of the digital visual media item 302. In some cases, the low-resolution segmentation mask includes a resolution that is between the resolution of the low-resolution copy of the digital visual media item 302 and the original resolution associated with the digital visual media item 302.

As will be discussed in more detail below, in one or more embodiments, the meticulous segmentation system 106 uses the low-resolution network 306 to generate the low-resolution segmentation mask by using the low-resolution network 306 to generate an initial segmentation mask corresponding to the low-resolution copy of the digital visual media item 302. Further, the meticulous segmentation system 106 utilizes the low-resolution network 306 to recursively refine the initial segmentation mask to generate a refined segmentation mask (e.g., the low-resolution segmentation mask).

As further shown in FIG. 3, the meticulous segmentation system 106 resizes the low-resolution segmentation mask (as shown by the indicator 308 indicating an increase in resolution) to generate a resized low-resolution segmentation mask 310. In some instances, the meticulous segmentation system 106 resizes the low-resolution segmentation mask to include the original resolution associated with the digital visual media item 302. In some cases, the meticulous segmentation system 106 resizes the low-resolution segmentation mask to include a resolution that is lower than the original resolution associated with the digital visual media item 302 but is higher than the resolution of the low-resolution copy of the digital visual media item 302.

Further, as shown in FIG. 3, the meticulous segmentation system 106 provides the resized low-resolution segmentation mask 310 to the high-resolution network 312. As shown, the meticulous segmentation system 106 utilizes the high-resolution network 312 to generate a high-resolution segmentation mask 314 corresponding to the digital visual media item 302 based on the resized low-resolution segmentation mask 310. In one or more embodiments, the high-resolution segmentation mask 314 includes a segmentation mask having a resolution that is equal to the original resolution associated with the digital visual media item 302.

As will be discussed in more detail below, in one or more embodiments, the meticulous segmentation system 106 uses the high-resolution network 312 to generate the high-resolution segmentation mask 314 by using the high-resolution network 312 to generate a segmentation mask corresponding to the resized low-resolution segmentation mask 310. Further, the meticulous segmentation system 106 utilizes the high-resolution network 312 to recursively refine that segmentation mask to generate a refined segmentation mask (e.g., the high-resolution segmentation mask 314).

Indeed, as discussed above, in one or more embodiments, the meticulous segmentation system 106 utilizes the low-resolution network 306 and the high-resolution network 312 to recursively refine a segmentation mask that corresponds to the digital visual media item 302. For example, in some cases, the meticulous segmentation system 106 uses the low-resolution network 306 and the high-resolution network 312 to generate a plurality of segmentation masks, with each subsequent segmentation mask including improvements over the previous segmentation mask with regard to distinguishing between an object and background portrayed in the digital visual media item 302. In some embodiments, refining a segmentation mask and generating a new segmentation mask that includes improvements over a previous segmentation mask are used interchangeably. Further, in one or more embodiments, the meticulous segmentation system 106 increases the resolution of the segmentation mask (e.g., generates segmentation masks with increased resolution) so that the final refined segmentation mask (e.g., the high-resolution segmentation mask) includes the original resolution associated with the digital visual media item 302.

As indicated by FIG. 3, in some implementations, the meticulous segmentation system 106 utilizes the high-resolution network 312 to generate the high-resolution segmentation mask 314 via patch-based refinement. To illustrate, in some implementations, the meticulous segmentation system 106 determines one or more patches corresponding to the digital visual media item 302. In one or more embodiments, a patch includes a portion of a digital visual media item that includes less than the entirety of the digital visual media item. In some implementations, a patch includes a resolution that corresponds to the original resolution associated with the digital visual media item. For example, in one or more embodiments, a patch includes a number of pixels included in the corresponding portion of the digital visual media item at the original resolution. In other words, in some cases, a patch includes a fractional portion of a digital visual media item and also includes a corresponding fraction of the pixels represented by the digital visual media item at the original resolution.

Accordingly, in some embodiments, the meticulous segmentation system 106 utilizes the high-resolution network 312 to generate the high-resolution segmentation mask 314 based on the resized low-resolution segmentation mask 310 and the one or more patches corresponding to the digital visual media item 302. For example, in some implementations, the meticulous segmentation system 106 utilizes the high-resolution network 312 to refine a portion of the resized low-resolution segmentation mask 310 based on a patch corresponding to that portion. The meticulous segmentation system 106 further utilizes the high-resolution network 312 to refine an additional portion of the resized low-resolution segmentation mask 310 based on another patch that corresponds to that additional portion. Thus, the meticulous segmentation system 106 utilizes the one or more patches to recover details in the original resolution associated with the digital visual media item 302.

Thus, in some implementations, the low-resolution network 306 includes a three-channel input that receives the RGB values of the digital visual media item 302. Further, the high-resolution network 312 includes a four-channel, where three channels receive the RGB values of the digital visual media item 302 (or the RGB values of a patch of the digital visual media item 302) and the fourth channel receives the resized low-resolution segmentation mask 310 (which is composed of binary values).

In one or more embodiments, the meticulous segmentation system 106 binarizes the final segmentation mask (e.g., the high-resolution segmentation mask 314) and stores the result for subsequent use. The image 316 shown in FIG. 3 illustrates the final segmentation of the object depicted in the digital visual media item 302 based on the high-resolution segmentation mask 314 generated using the low-resolution network 306 and the high-resolution network 312.

By utilizing a segmentation refinement neural network having a low-resolution network and a high-resolution network, the meticulous segmentation system 106 operates more flexibly than conventional systems. In particular, by using a high-resolution network of a segmentation refinement neural network to recursively refine a segmentation mask for a digital visual media item, the meticulous segmentation system 106 flexibly adapts to high-resolution digital visual media items. Indeed, the meticulous segmentation system 106 flexibly generates high-resolution segmentation masks that provide a greater amount of detail than produced under conventional systems to capture the hard-to-see details that are better represented in high-resolution digital visual media items.

In alternative implementations, the meticulous segmentation system 106 utilizes a conventional segmentation neural network rather than the low-resolution network 306. In such implementations, the meticulous segmentation system 106 utilizes the conventional segmentation neural network to generate an initial segmentation, which is then provided to the high-resolution network 312 as an input instead of the resized low-resolution segmentation mask 310 generated utilizing the low-resolution network 306. For example, in one or more implementations, to generate an initial segmentation mask, the meticulous segmentation system 106 utilizes a salient object segmentation neural network such as that described by Pao et al. in U.S. patent application Ser. No. 15/967,928 filed on May 1, 2018, entitled ITERATIVELY APPLYING NEURAL NETWORKS TO AUTOMATICALLY IDENTIFY PIXELS OF SALIENT OBJECTS PORTRAYED IN DIGITAL IMAGES, the contents of which are expressly incorporated herein by reference in their entirety. In another embodiment, the meticulous segmentation system 106, to generate an initial segmentation mask, utilizes an image mask generation system such as that described by Zhang et al. in U.S. patent application Ser. No. 16/988,055 filed on Aug. 7, 2020, entitled GENERATING AN IMAGE MASK FOR A DIGITAL IMAGE BY UTILIZING A MULTI-BRANCH MASKING PIPELINE WITH NEURAL NETWORKS, the contents of which are expressly incorporated herein by reference in their entirety. In yet another embodiment, to generate an initial segmentation mask, the meticulous segmentation system 106 utilizes a multi-model object selection system such as that described by Price et al. in U.S. Patent Application Publication No. 2019/0236394 filed on Apr. 5, 2019, entitled UTILIZING INTERACTIVE DEEP LEARNING TO SELECT OBJECTS IN DIGITAL VISUAL MEDIA, the contents of which are expressly incorporated herein by reference in their entirety.

Figure 4:
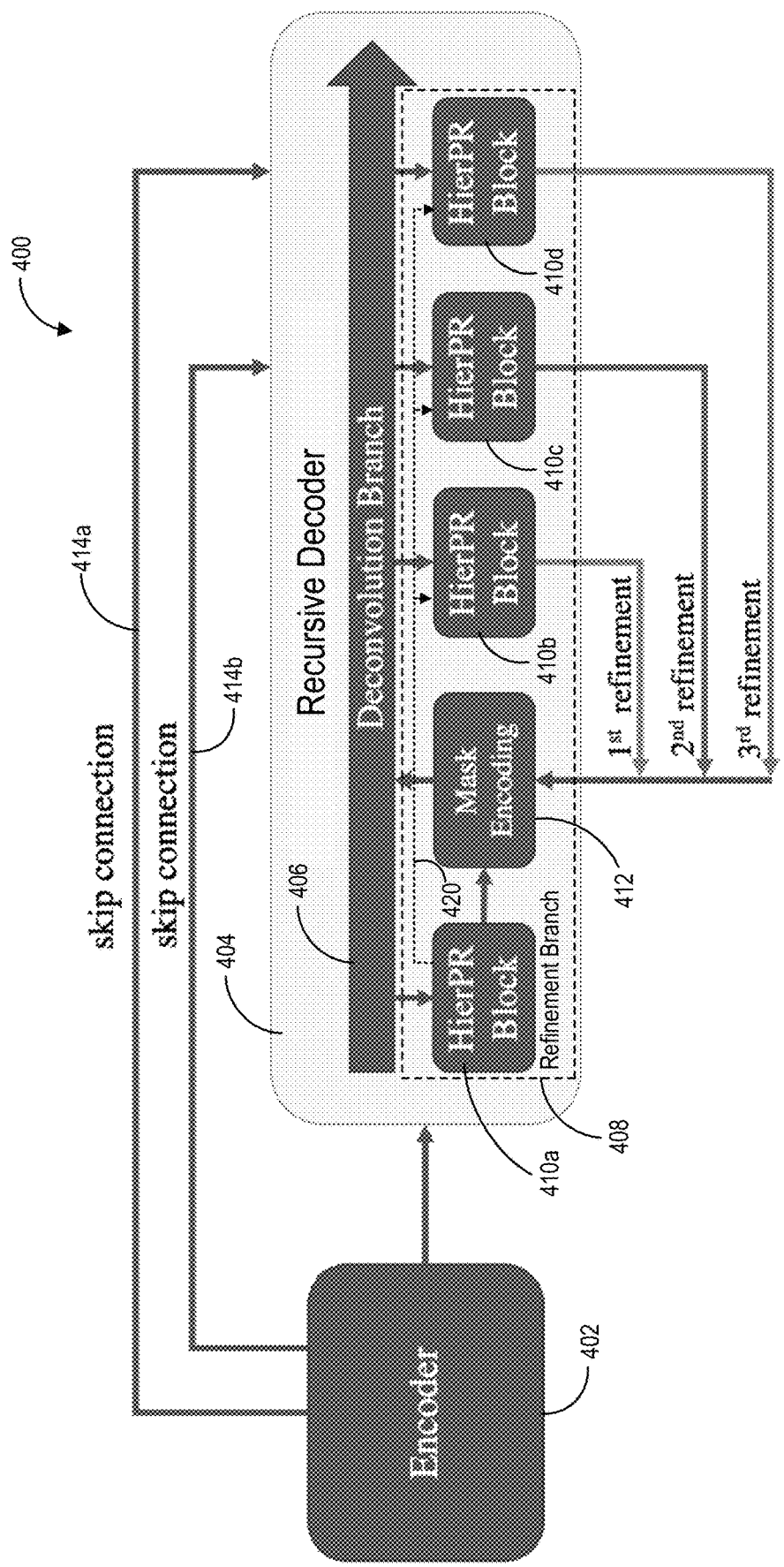
FIG. 4 illustrates an encoder-decoder network architecture of a segmentation refinement neural network in accordance with one or more embodiments.

As discussed above, in one or more embodiments, the meticulous segmentation system 106 utilizes a segmentation refinement neural network having an encoder-decoder network architecture. In particular, in some implementations, the segmentation refinement neural network includes a low-resolution network and a high-resolution network having the same network architecture. That is, in some implementations, the low-resolution network and high-resolution network of the segmentation refinement neural network include an encoder-decoder network architecture. Thus, much of the following discussion will reference the segmentation refinement neural network generally. It should be understood, however, that the discussion applies to separate low-resolution and high-resolution networks of the segmentation refinement neural network in many cases. For example, FIG. 4 illustrates an encoder-decoder network architecture of a segmentation refinement neural network in accordance with one or more embodiments. It should be understood, however, that FIG. 4 illustrates an encoder-decoder network architecture of a low-resolution and high-resolution network of a segmentation refinement neural network in accordance with one or more embodiments.

As shown in FIG. 4, a segmentation refinement neural network 400 includes an encoder 402. The encoder 402 can include various network/encoder architectures. For example, in some implementations, the encoder 402 includes a feature extraction network. For example, in one or more embodiments, the encoder 402 includes a convolutional neural network. In some implementations, the encoder 402 further includes a neural network backbone. For example, in some cases, the encoder 402 includes a residual neural network backbone. In some implementations, the encoder 402 includes a mobile neural network backbone.

For example, in one or more implementations, the encoder 402 comprises includes at least one of the convolutional neural network architectures described in U.S. Pat. No. 10,460,214, entitled Deep Salient Conventional Neural Networks For Efficient Digital Object Segmentation, filed on Oct. 31, 2017, which is incorporated herein by reference in its entirety. In still further implementations, the encoder 402 comprises the backbone neural network described in U.S. patent application Ser. No. 16/988,408, entitled Generating Refined Segmentation Masks Based On Uncertain Pixels, filed on Aug. 7, 2020, which is incorporated herein by reference in its entirety. In still further implementations, the encoder 402 comprises the encoder described by Zhao et al., in Pyramid scene parsing network, In Proceedings of the IEEE conference on computer vision and pattern recognition, pages 2881-2890, 2017, which is incorporated herein by reference in its entirety. In such implementations, the encoder 402 optionally comprises ResNet50 and MobileNetV3 backbones as described, respectively, by He et al. in Deep Residual Learning For Image Recognition In Proceedings of the IEEE conference on computer vision and pattern recognition, pages 770-778, 2016, and Howard et al., in Searching For Mobilenetv3, In Proceedings of the IEEE International Conference on Computer Vision, pages 1314-1324, 2019, each of which are hereby incorporated by reference in their entirety.

In one or more embodiments, the meticulous segmentation system 106 utilizes the encoder 402 to extract encoded feature maps from a digital visual media item. In one or more embodiments, a feature map generally includes a set of numerical values representing features utilized by a neural network, such as a segmentation refinement neural network. To illustrate, in some instances, a feature map includes a set of values corresponding to latent and/or patent attributes and characteristics of an input analyzed by a neural network (e.g., a digital visual media item). In one or more embodiments, an encoded feature map includes a feature map generated by an encoder of a neural network. For example, in some cases, an encoded feature map includes a set of encoded values corresponding to latent and/or patent attributes and characteristics of an input analyzed by the neural network or, more specifically, the encoder (e.g., a digital visual media item). In contrast, in one or more embodiments, a decoded feature map includes a feature map generated by a decoder of a neural network. For example, in some cases, a decoded feature map includes a set of decoded values corresponding to latent and/or patent attributes and characteristics of an input analyzed by the neural network or, more specifically, the decoder.

As further shown in FIG. 4, the segmentation refinement neural network 400 also includes a recursive decoder 404. In one or more embodiments, a recursive decoder includes a neural network decoder that generates an output using a recursive process. In particular, in one or more embodiments, a recursive decoder includes a neural network decoder that generates a refined segmentation mask (e.g., a low-resolution segmentation mask or a high-resolution segmentation mask) corresponding to a digital visual media item using a recursive process. For example, in some implementations, a recursive decoder includes a neural network decoder that generates a segmentation mask based on an input to the recursive decoder (e.g., a digital visual media item or a resized low-resolution segmentation mask corresponding to the digital visual media item) and iteratively refines the segmentation mask (e.g., generates refined segmentation masks).

As shown in FIG. 4, the recursive decoder 404 includes a deconvolution branch 406. In one or more embodiments, a deconvolution branch includes a component of a segmentation refinement neural network that generates decoded feature maps. In particular, in some embodiments, a deconvolution branch includes one or more deconvolutional layers of a recursive decoder of a segmentation refinement neural network that generates decoded feature maps. For example, in some implementations, a deconvolution branch includes one or more deconvolutional layers that generate decoded feature maps based on inputs to the deconvolution branch.

Indeed, in one or more embodiments, the meticulous segmentation system 106 utilizes the deconvolution branch 406 of the recursive decoder 404 to generate a plurality of decoded feature maps. For example, in some implementations, the meticulous segmentation system 106 utilizes the deconvolution branch 406 to generate one or more decoded feature maps based on one or more of the encoded feature maps generated by the encoder 402. In some implementations, the meticulous segmentation system 106 utilizes the deconvolution branch 406 to generate one or more decoded feature maps further based on values (e.g., encodings of coarse-to-fine variations) generated by the refinement branch 408 of the recursive decoder 404.

In one or more embodiments, the meticulous segmentation system 106 utilizes the deconvolution branch 406 to recover the resolution of feature maps with respect to the input of the segmentation refinement neural network 400. In particular, in some cases, the meticulous segmentation system 106 utilizes the deconvolution branch 406 to gradually increase the resolution of the decoded feature maps. For example, in some implementations, the meticulous segmentation system 106 utilizes the deconvolution branch 406 to implement a gradually decreasing stride when generating the decoded feature maps (strides of 8, 8, 4, and 2 as one example implementation).

As shown in FIG. 4, and as suggested above, the recursive decoder 404 further includes a refinement branch 408. In one or more embodiments, a refinement branch includes a component of a segmentation refinement neural network that generates and refines segmentation masks. In particular, in some embodiments, a refinement branch includes a component of a recursive decoder of a segmentation refinement neural network that generates and refines segmentation masks. For example, in some cases, a refinement branch generates a segmentation mask corresponding to an input of the segmentation refinement neural network and recursively refines the segmentation mask (e.g., by generating subsequent refined segmentation masks).

In one or more embodiments, the meticulous segmentation system 106 utilizes the refinement branch 408 to generate and refine a segmentation mask. For example, in one or more embodiments, the meticulous segmentation system 106 utilizes the refinement branch to generate and refine a segmentation mask based on the decoded feature maps generated by the deconvolution branch 406. In some instances, the meticulous segmentation system 106 utilizes the refinement branch 408 to generate and refine a segmentation mask further based on encoded feature maps generated by the encoder 402. In some implementations, the meticulous segmentation system 106 utilizes the refinement branch 408 to generate and refine a segmentation mask further based on other outputs, such as those generated by components of the refinement branch 408 itself as will be discussed in more detail below.

In some embodiments, the meticulous segmentation system 106 utilizes the refinement branch 408 to refine the coarse outputs from the deconvolution branch 406 (e.g., the decoded feature maps). In some implementations, the meticulous segmentation system 106 utilizes the refinement branch 408 to refine an averaged combination of outputs from both branches. In some cases, the meticulous segmentation system 106 utilizes the refinement branch 408 to perform point-wise refinements, as will be discussed below. Further, as will be discussed below, the meticulous segmentation system 106 utilizes the refinement branch 408 to implement relatively lower strides than the deconvolution branch 406 (e.g., strides 4, 4, 2, and 1 as one example implementation).

As shown in FIG. 4, the refinement branch 408 of the recursive decoder 404 includes hierarchical point-wise refining blocks 410a-410d. In one or more embodiments, a hierarchical point-wise refining block includes a component of a segmentation refinement neural network that generates an iteration of a segmentation mask. In particular, in some embodiments, a hierarchical point-wise refining block includes a point-wise processing unit of a recursive decoder of a segmentation refinement neural network that generates a segmentation mask based on various inputs to the hierarchical point-wise refining block. In some implementations, a hierarchical point-wise refining block generates a segmentation mask (e.g., a refined segmentation mask) that includes refinements to a segmentation mask generated by a previous hierarchical point-wise refining block. The architecture and operation of a hierarchical point-wise refining block will be discussed in more detail below.

Further, as shown in FIG. 4, the refinement branch 408 of the recursive decoder 404 also includes a mask encoding layer 412. In one or more embodiments, a mask encoding layer includes a component of a segmentation refinement neural network that generates encodings of coarse-to-fine variations. In particular, in some embodiments, a mask encoding layer includes a component of a recursive decoder of a segmentation refinement neural network that generates coarse-to-fine variations between segmentation masks For example, in some cases, a mask encoding layer generates encodings of coarse-to-fine variations based on a pair of segmentation masks.

In one or more embodiments, coarse-to-fine variations include differences between segmentation masks. In particular, in some embodiments, coarse-to-fine variations include differences between the segmentation represented in different segmentation masks based on a difference in resolutions of the segmentation masks. For example, in some implementations, coarse-to-fine variations include differences based on a first segmentation mask providing a more detailed segmentation when compared to a second segmentation mask due to the first segmentation mask having a higher resolution than the second segmentation mask.

Indeed, as shown in FIG. 4, the meticulous segmentation system 106 provides one or more decoded feature maps generated by the deconvolution branch 406 to each of the hierarchical point-wise refining blocks 410a-410d. As will be discussed more below, the meticulous segmentation system 106 utilizes the hierarchical point-wise refining blocks 410a-410d to generate segmentation masks as output. In particular, the meticulous segmentation system 106 utilizes the hierarchical point-wise refining block 410 a to generate an initial segmentation mask and further utilizes the hierarchical point-wise refining blocks 410b-410d to refine the segmentation mask (e.g., generate refined segmentation masks).

Though, FIG. 4 illustrates each of the hierarchical point-wise refining blocks 410a-410d as a single block, it should be understood that one or more of the hierarchical point-wise refining blocks 410a-410d include multiple hierarchical point-wise refining blocks in some embodiments. Further, as will be discussed below, in some cases, the hierarchical point-wise refining blocks 410a-410d make up a hierarchy of hierarchical point-wise refining blocks. For example, in some implementations, the hierarchical point-wise refining blocks 410a includes a first hierarchical point-wise refining block for generating an initial segmentation mask, and the hierarchical point-wise refining blocks 410b-410d implement a three-cycle up-sampling process that recursively up-samples the initial segmentation mask while recursively refining the initial segmentation mask.

As shown in FIG. 4, the meticulous segmentation system 106 provides the segmentation masks generated by the hierarchical point-wise refining blocks 410a-410d to the mask encoding layer 412. Further, the meticulous segmentation system 106 provides the encodings of the coarse-to-fine variations generated by the mask encoding layer 412 back to the deconvolution branch 406. Accordingly, in some embodiments, the meticulous segmentation system 106 utilizes the deconvolution branch 406 to generate at least some of the decoded feature maps based on the encodings of the coarse-to-fine variations.

As further shown in FIG. 4, the segmentation refinement neural network 400 further includes the skip connections 414a-414b. In one or more embodiments, the meticulous segmentation system 106 utilizes the skip connections 414a-414b to provide feature values generated by components positioned early in the segmentation refinement neural network 400 to components positioned later in the segmentation refinement neural network 400. In one or more embodiments, a feature value includes a numerical value generated by a component of a neural network, such as a segmentation refinement neural network. In particular, in some instances, a feature value includes a value that corresponds to one or more latent and/or patent attributes and characteristics of an input analyzed by a neural network or neural network component. In one or more embodiments, a feature value includes a low-level feature value that corresponds to one or more low-level (e.g., local) attributes and characteristics of an input analyzed by a neural network or neural network component. Additionally, in some cases, a feature value includes a high-level feature value that corresponds to one or more high-level (e.g., global or regional) attributes and characteristics of an input analyzed by a neural network or neural network component.

Though two skip connections are shown, it should be understood that, in some implementations, the segmentation refinement neural network 400 includes fewer or additional skip connections. For example, in some implementations, the segmentation refinement neural network 400 includes a first set of skip connections connecting the last two deconvolutional layers of the deconvolution branch 406 to the hierarchical point-wise refining block 410a and the first convolutional layer of the encoder 402 and a second set of skip connections connecting the hierarchical point-wise refining blocks 410b-410d to the hierarchical point-wise refining block 410a (represented by the line 420). Indeed, various additional configurations are possible.

In one or more embodiments, the feature values passed via the skip connections are relatively low-value (e.g., more local) when performing refinements with a relatively high stride. In contrast, in some embodiments, the feature values passed via the skip connections are relatively high-level (e.g., more global) when performing refinements with a relatively low stride. In some embodiments, by using a skip connection configuration as discussed above, the meticulous segmentation system 106 adaptively provides detail information at low resolution and semantic guidance at high resolution.

Figure 5:
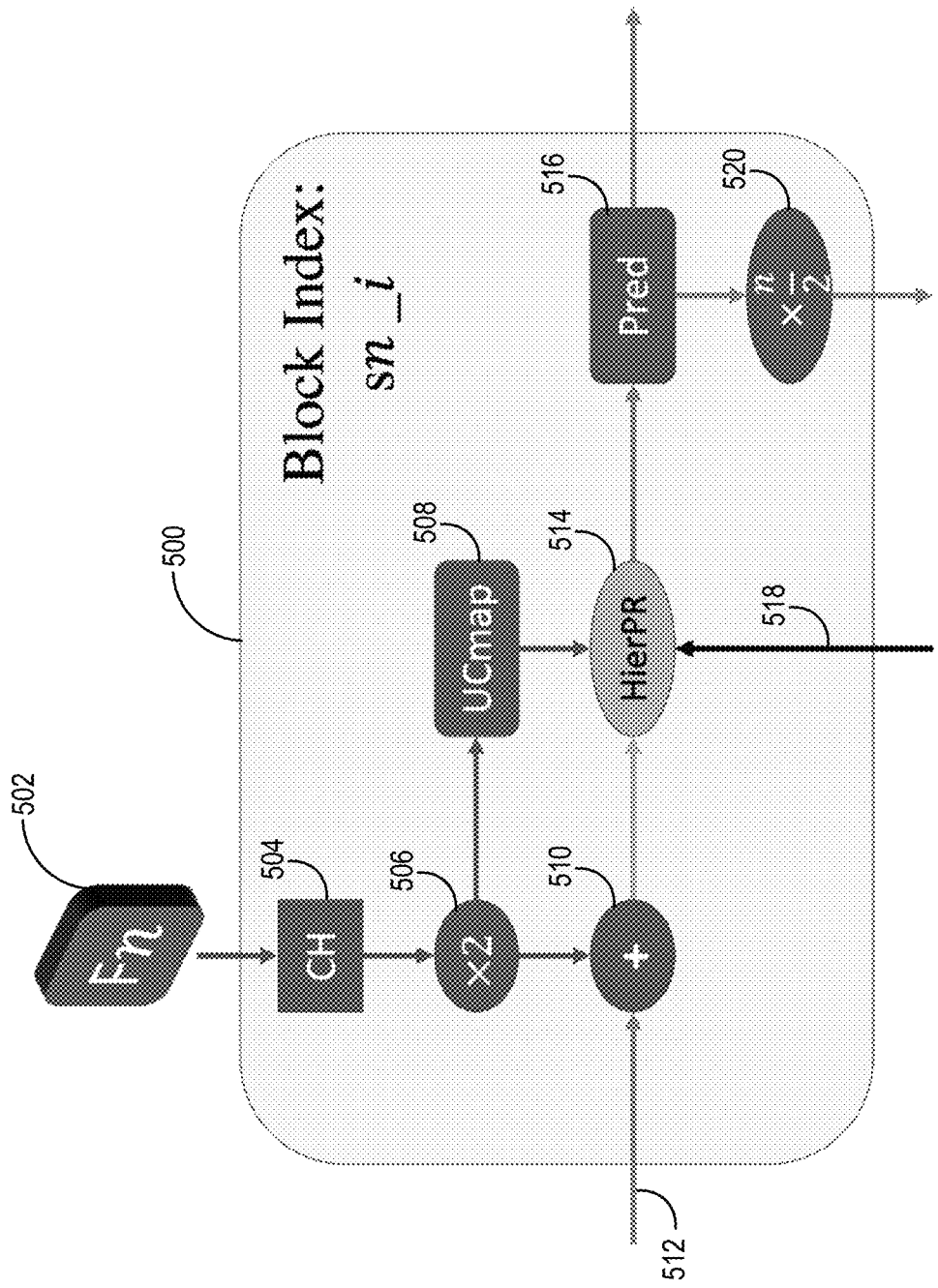
FIG. 5 illustrates an architecture of a hierarchical point-wise refining block in accordance with one or more embodiments.

As previously mentioned, in one or more embodiments, the meticulous segmentation system 106 utilizes a hierarchical point-wise refinement map to generate a segmentation mask. In particular, the meticulous segmentation system 106 utilizes the hierarchical point-wise refinement map within the recursive decoder of a segmentation refinement neural network. FIG. 5 illustrates an architecture of a hierarchical point-wise refining block in accordance with one or more embodiments.

Indeed, FIG. 5 illustrates the hierarchical point-wise refining block 500. As shown, the hierarchical point-wise refining block 500 is associated with a block index sn_i. In particular, n represents the output stride associated with the decoded feature map 502 (represented as Fn) received as input from the deconvolution branch. Further, i represents the internal cycle index to which the hierarchical point-wise refining block 500 belongs. Indeed, in one or more embodiments, the block index references a particular hierarchical point-wise refining block within the recursive decoder of the segmentation refinement neural network.

As shown in FIG. 5, the hierarchical point-wise refining block 500 includes a coarse head predictor 504. In one or more embodiments, the coarse head predictor 504 generates a predicted segmentation corresponding to the input of the segmentation refinement neural network based on the decoded feature map 502. For example, in some instances, the coarse head predictor 504 generates a coarse segmentation mask that predicts whether each pixel represented in the coarse segmentation mask corresponds to an object or a background. In one or more embodiments, the coarse head predictor 504 includes a pair of 1×1 convolutional layers, though the coarse head predictor 504 can include fewer or additional layers in other embodiments.

As further shown in FIG. 5, the hierarchical point-wise refining block 500 also includes the operation 506. In one or more embodiments, the hierarchical point-wise refining block 500 utilizes the operation 506 to increase the size (e.g., the resolution) of the coarse segmentation mask generated by the coarse head predictor 504. For example, as shown, in some embodiments, the hierarchical point-wise refining block 500 utilizes the operation 506 to double the size (e.g., resolution) of the coarse segmentation mask.

Additionally, as shown in FIG. 5, the hierarchical point-wise refining block 500 generates an uncertainty map 508 based on the resized coarse segmentation mask. In one or more embodiments, an uncertainty map includes a set of uncertainty scores (i.e., a value that indicates whether the classification of a corresponding pixel is certain or uncertain). For example, in some embodiments, an uncertainty map corresponds to a segmentation mask and includes a collection of uncertainty scores with each uncertainty score corresponding to a pixel of the segmentation mask. Indeed, in some implementations, an uncertainty map includes a one-channel map that gives an uncertainty score for each represented pixel.

In one or more embodiments, the hierarchical point-wise refining block 500 determines the uncertainty scores represented in the uncertainty map 508 by determining, for each pixel of the coarse segmentation mask, the absolute distance between the predicted value (e.g., the value corresponding to the predicted classification) for that pixel and 0.5. In some embodiments, the hierarchical point-wise refining block 500 determines that pixels having a relatively smaller absolute distance are associated with a relatively larger uncertainty as to whether or not the pixel was correctly classified.

In one or more embodiments, the hierarchical point-wise refining block 500 sorts the pixels of the coarse segmentation mask based on their corresponding uncertainty scores. The hierarchical point-wise refining block 500 further selects a pre-configured number of pixels to refine based on the sorting. Accordingly, in some cases, the hierarchical point-wise refining block 500 selects the pixels associated with the most uncertainty for refinement. In one or more embodiments, the meticulous segmentation system 106 adjusts the pre-configured number of pixels to be selected based on user input, though the pre-configured number of pixels is fixed in other embodiments.

As further shown in FIG. 5, the hierarchical point-wise refining block 500 includes the operation 510. In one or more embodiments, the hierarchical point-wise refining block 500 utilizes the operation 510 to combine the resized coarse segmentation mask with a segmentation mask generated from a previous hierarchical point-wise refining block (shown as input by the arrow 512) where such a segmentation mask is available. For example, in some cases the hierarchical point-wise refining block 500 utilizes the operation 510 to concatenate the resized coarse segmentation mask and the segmentation mask generated from the previous hierarchical point-wise refining block. In some cases, where a segmentation mask from a previous hierarchical point-wise refining block is not available (e.g., the hierarchical point-wise refining block 500 is the first in the recursive decoder), the hierarchical point-wise refining block 500 merely passes through the resized coarse segmentation mask.

Additionally, as shown in FIG. 5, the hierarchical point-wise refining block 500 includes the hierarchical point-wise refining unit 514. In one or more embodiments, the hierarchical point-wise refining unit 514 includes a perceptron. For example, in some implementations, the hierarchical point-wise refining unit 514 includes a multi-layer perceptron (e.g., a three-layer perceptron, a four-layer perceptron, etc.). In one or more embodiments, the hierarchical point-wise refining block 500 utilizes the hierarchical point-wise refining unit 514 to generate a segmentation mask 516. For example, as indicated by FIG. 5, the hierarchical point-wise refining unit 514 generates the segmentation mask 516 based on the uncertainty map 508, the resized coarse segmentation mask, and one or more encoded feature maps from the encoder (shown as input by the arrow 518). Indeed, in some cases, the hierarchical point-wise refining unit 514 utilizes the uncertainty map 508 to identify those pixels of the resized coarse segmentation mask selected for refinement. Further, as shown, the hierarchical point-wise refining unit 514 generates the segmentation mask 516 based on the resized coarse segmentation mask (combined with the segmentation mask from the previous hierarchical point-wise refining block where possible).

As further shown, the hierarchical point-wise refining unit 514 generates the segmentation mask 516 based on one or more encoded feature maps from the encoder (shown as input by the arrow 518). For example, in some implementations, the meticulous segmentation system 106 provides, to the hierarchical point-wise refining block 500, an encoded feature map having a size that corresponds to the size of the resized coarse segmentation mask. Accordingly, the hierarchical point-wise refining unit 514 utilizes feature values from the encoded feature map to refine corresponding pixels from the resized coarse segmentation mask. Thus, the hierarchical point-wise refining unit 514 performs local refinements at selected pixels with pixel inputs from high-level feature maps.

As further shown in FIG. 5, the hierarchical point-wise refining block 500 includes the operation 520. In one or more embodiments, the hierarchical point-wise refining block 500 utilizes the operation 520 to reduce the output stride associated with the segmentation mask 516. For example, in some implementations, the hierarchical point-wise refining block 500 utilizes the operation to implement half the stride associated with the decoded feature map 502 used as input. It should be understood, however, that the hierarchical point-wise refining block 500 does not implement the operation 520 in some cases, such as when the hierarchical point-wise refining block 500 is the final block in the recursive decoder.

Accordingly, in one or more embodiments, the hierarchical point-wise refining block 500 generates a segmentation mask based on at least one decoded feature map from the deconvolution branch of the recursive decoder. In some cases, the hierarchical point-wise refining block 500 generates the segmentation mask further based on a segmentation mask from a previous hierarchical point-wise refining block. In some implementations, the hierarchical point-wise refining block 500 generates the segmentation mask further based on at least one encoded feature map from the encoder of the segmentation refinement neural network.

Figure 6:
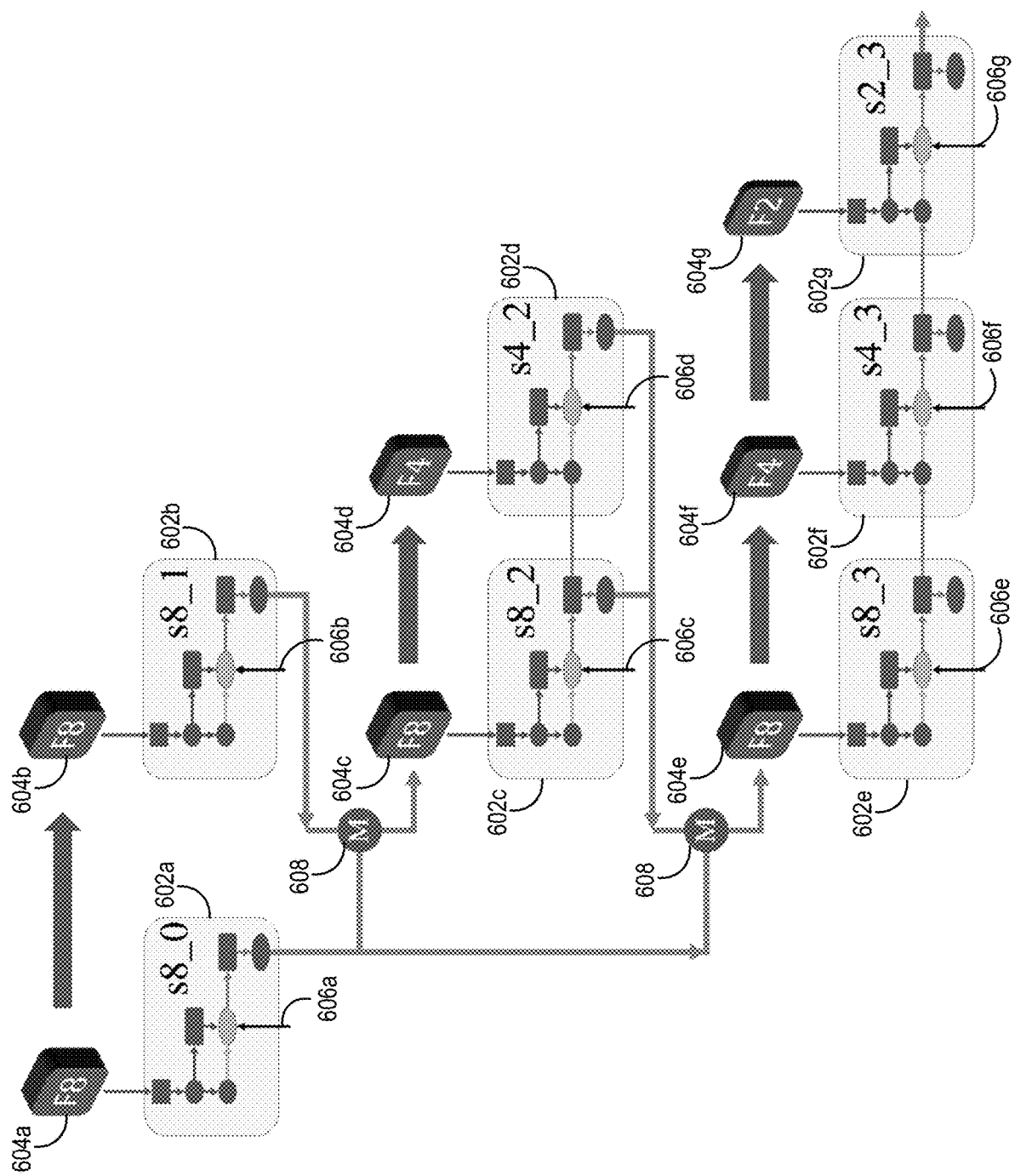
FIG. 6 illustrates a block diagram of a hierarchy of hierarchical point-wise refining blocks in accordance with one or more embodiments.

As discussed above, in one or more embodiments, the segmentation refinement neural network (e.g., the low-resolution and high-resolution networks) utilized by the meticulous segmentation system 106 includes a hierarchy of hierarchical point-wise refining blocks. FIG. 6 illustrates a block diagram of a hierarchy of hierarchical point-wise refining blocks in accordance with one or more embodiments.

In particular, FIG. 6 illustrates how the hierarchy of hierarchical point-wise refining blocks is arranged within the recursive decoder of a segmentation refinement neural network in accordance with one or more embodiments. For example, FIG. 6 illustrates the hierarchical point-wise refining blocks 602a-602g. In one or more embodiments, the hierarchical point-wise refining block 602a corresponds to the hierarchical point-wise refining block 410a of FIG. 4. Additionally, the hierarchical point-wise refining block 602b corresponds to the hierarchical point-wise refining block 410b of FIG. 4. Further, the hierarchical point-wise refining blocks 602c-602d correspond to the hierarchical point-wise refining block 410c of FIG. 4. Also, the hierarchical point-wise refining block 602e-602g correspond to the hierarchical point-wise refining block 410d of FIG. 4.

As shown in FIG. 6, the meticulous segmentation system 106 provides the decoded feature maps 604a-604g from the deconvolution branch to the hierarchical point-wise refining blocks 602a-602g, respectively. Further, the meticulous segmentation system 106 provides an encoded feature map to each of the hierarchical point-wise refining blocks 602a-602g (as shown by the arrows 606a-606g). Also, as illustrated, the meticulous segmentation system 106 provides the segmentation mask generated by the hierarchical point-wise refining blocks 602c, 602e-602f to the hierarchical point-wise refining blocks 602d, 602f-602g, respectively. In some embodiments, however, rather than providing the segmentation mask generated by the hierarchical point-wise refining blocks 602c, 602e-602f, the meticulous segmentation system 106 provides the uncertainty map generated by the hierarchical point-wise refining blocks 602c, 602e-602f.

Additionally, as shown in FIG. 6, the meticulous segmentation system 106 provides the segmentation mask with the reduced output stride generated by the hierarchical point-wise refining blocks 602a-602d to the mask encoding layer 608. In particular, as shown in FIG. 6, the meticulous segmentation system 106 combines (e.g., concatenates) the segmentation mask with reduced output stride from the hierarchical point-wise refining block 602b or the hierarchical point-wise refining blocks 602c-602d with the segmentation mask with the reduced output stride from the hierarchical point-wise refining block 602a and provides the result to the mask encoding layer 608. As discussed above, and as shown in FIG. 6, the meticulous segmentation system 106 utilizes the mask encoding layer 608 to generate encodings of coarse-to-fine variations and further provides the encodings to the deconvolution branch to generate decoded feature maps. In some embodiments, however, rather than providing the segmentation masks to the mask encoding layer 608, the meticulous segmentation system 106 provides the corresponding uncertainty maps.

In one or more embodiments, the meticulous segmentation system 106 utilizes the same weights globally across the hierarchical point-wise refining units of the hierarchical point-wise refining blocks 602a-602g. In some implementations, the meticulous segmentation system 106 utilizes the same weights across other components of the hierarchical point-wise refining blocks 602a-602g when vertically aligned as shown in FIG. 6.

FIG. 6 further illustrates the meticulous segmentation system 106 utilizing the hierarchy of the hierarchical point-wise refining blocks 602a-602g to generate a refined segmentation mask by recursively up-sampling an initial segmentation mask while recursively refining the initial segmentation mask. Indeed, as shown, the meticulous segmentation system 106 utilizes the hierarchical point-wise refining blocks 602b-602g to implement a three-cycle up-sample process for recursively refining and up-sampling an initial segmentation mask.

To illustrate, as suggested above, the meticulous segmentation system 106 utilizes the hierarchical point-wise refining block 602a to generate an initial segmentation mask in some cases. Further, the meticulous segmentation system 106 utilizes a first up-sampling cycle composed of a first set of hierarchical point-wise refining blocks (e.g., the hierarchical point-wise refining block 602b) to generate a first up-sampled segmentation mask that includes a first set of refinements to the initial segmentation mask. In one or more embodiments, an up-sampled segmentation mask generally includes a segmentation mask generated via up-sampling of another segmentation mask. In some implementations, an up-sampled segmentation mask includes a refined segmentation mask so that it is up-sampled from a previous segmentation mask and includes refinements to the previous segmentation mask.

To further the illustration, the meticulous segmentation system 106 utilizes a second up-sampling cycle composed of a second set of hierarchical point-wise refining blocks (e.g., the hierarchical point-wise refining blocks 602c-602d) to generate a second up-sampled segmentation mask that includes a second set of refinements. In particular, the meticulous segmentation system 106 generates the second up-sampled segmentation mask based on the first up-sampled segmentation mask (and the initial segmentation mask in some cases). Additionally, the meticulous segmentation system 106 utilizes a third up-sampling cycle composed of a third set of hierarchical point-wise refining blocks (e.g., the hierarchical point-wise refining blocks 602e-602g) to generate a third up-sampled segmentation mask that includes a third set of refinements. In some embodiments, the meticulous segmentation system 106 generates the third up-sampled segmentation mask based on the second up-sampled segmentation mask (and the initial segmentation mask in some cases).

FIG. 6 illustrates implementation of the three-cycle up-sampling process using a particular progression of strides. For example, FIG. 6 illustrates the meticulous segmentation system 106 initializing a stride 4 segmentation mask using the hierarchical point-wise refining block 602 a and then utilizing the three-cycle up-sampling process. In particular, FIG. 6 shows the three cycles consisting of different lengths and recovering the resolution to stride 4, 2, and 1 sequentially via a cascade of the hierarchical point-wise refining blocks 602b-602g. It should be noted, however, that the meticulous segmentation system 106 can utilize various alternative stride progressions in other embodiments.

By utilizing a hierarchy of hierarchical point-wise refining blocks, the meticulous segmentation system 106 operates more flexibly than conventional systems. Indeed, by utilizing the hierarchy of hierarchical point-wise refining blocks that recursively refines a segmentation mask, the meticulous segmentation system 106 flexibly generates segmentation masks that provide a greater level of detail than available under conventional systems. For example, the meticulous segmentation system 106 utilizes the hierarchy of hierarchical point-wise refining blocks to recursively identify uncertain pixels and refine the current segmentation mask by refining those uncertain pixels.

Figure 7A:
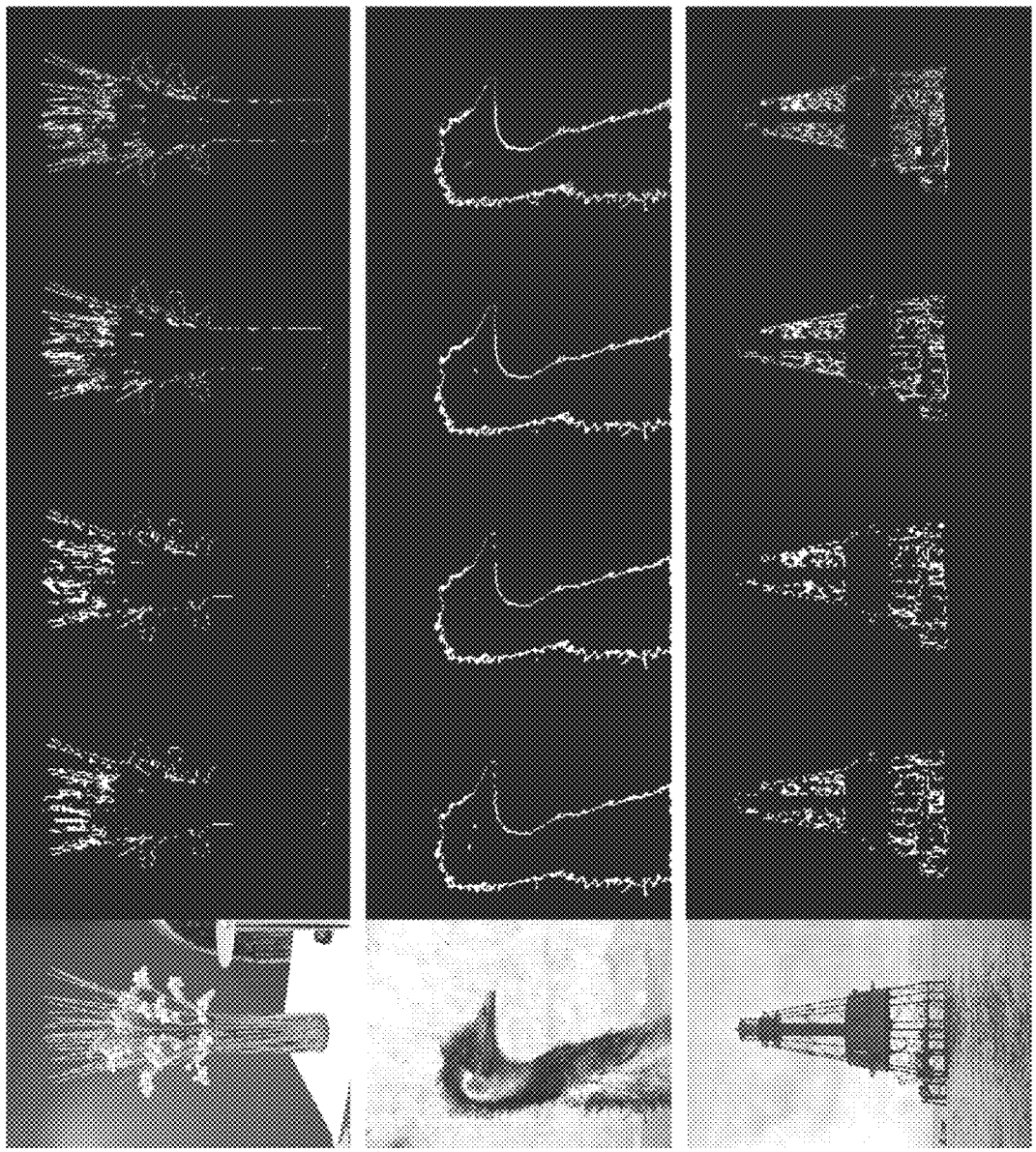
FIGS. 7A-7B illustrate graphical representations showing recursive improvements in the segmentation determined by the recursive decoder via the hierarchy of hierarchical point-wise refining blocks in accordance with one or more embodiments.
Figure 7B:
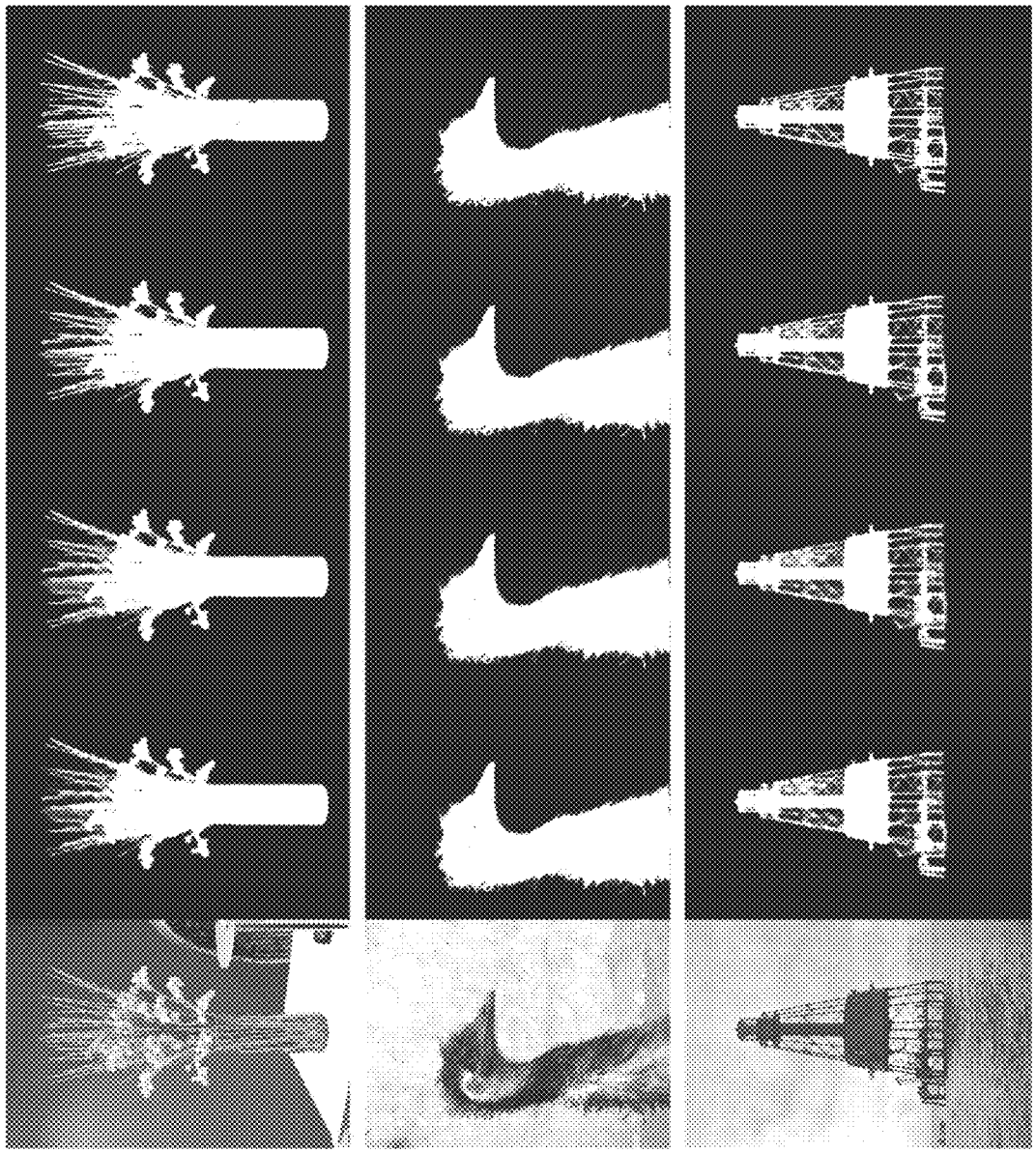

In one or more embodiments, as the hierarchy of hierarchical point-wise refining blocks of the recursive decoder processes input to the segmentation refinement neural network (e.g., input to the corresponding low-resolution and high-resolution network), the meticulous segmentation system 106 recursively improves upon the segmentation of a digital visual media item. FIGS. 7A-7B illustrate graphical representations showing recursive improvements in the segmentation determined by the recursive decoder via the hierarchy of hierarchical point-wise refining blocks in accordance with one or more embodiments.

In particular, FIG. 7A illustrates various uncertainty maps generated for digital visual media items by the recursive decoder using hierarchical point-wise refining blocks of various indices included in a hierarchy. As shown by the uncertainty maps of FIG. 7A, the recursive decoder progressively improves upon the identification of which pixels belong to the object portrayed in the digital visual media item while progressing deeper into the hierarchy. In particular, the boundaries of the object become more detailed while the number of uncertain pixels decreases.

Similarly, FIG. 7B illustrates various segmentation maps generated by the recursive decoder using those same hierarchical point-wise refining blocks (e.g., based on the uncertainty maps illustrated in FIG. 7A). As shown in FIG. 7B, the recursive decoder progressively improves upon the segmentation of the digital visual media item while progressing deeper into the hierarchy of hierarchical point-wise refining blocks. Indeed, the segmentation masks generated by the later hierarchical point-wise refining blocks more clearly define the object of the corresponding digital visual media item compared to the segmentation masks generated by the earlier hierarchical point-wise refining blocks. Thus, the meticulous segmentation system 106 utilizes the recursive decoder to recursively refine a segmentation mask for a digital visual media item via a hierarchy of hierarchical point-wise refining blocks.

Figure 8:
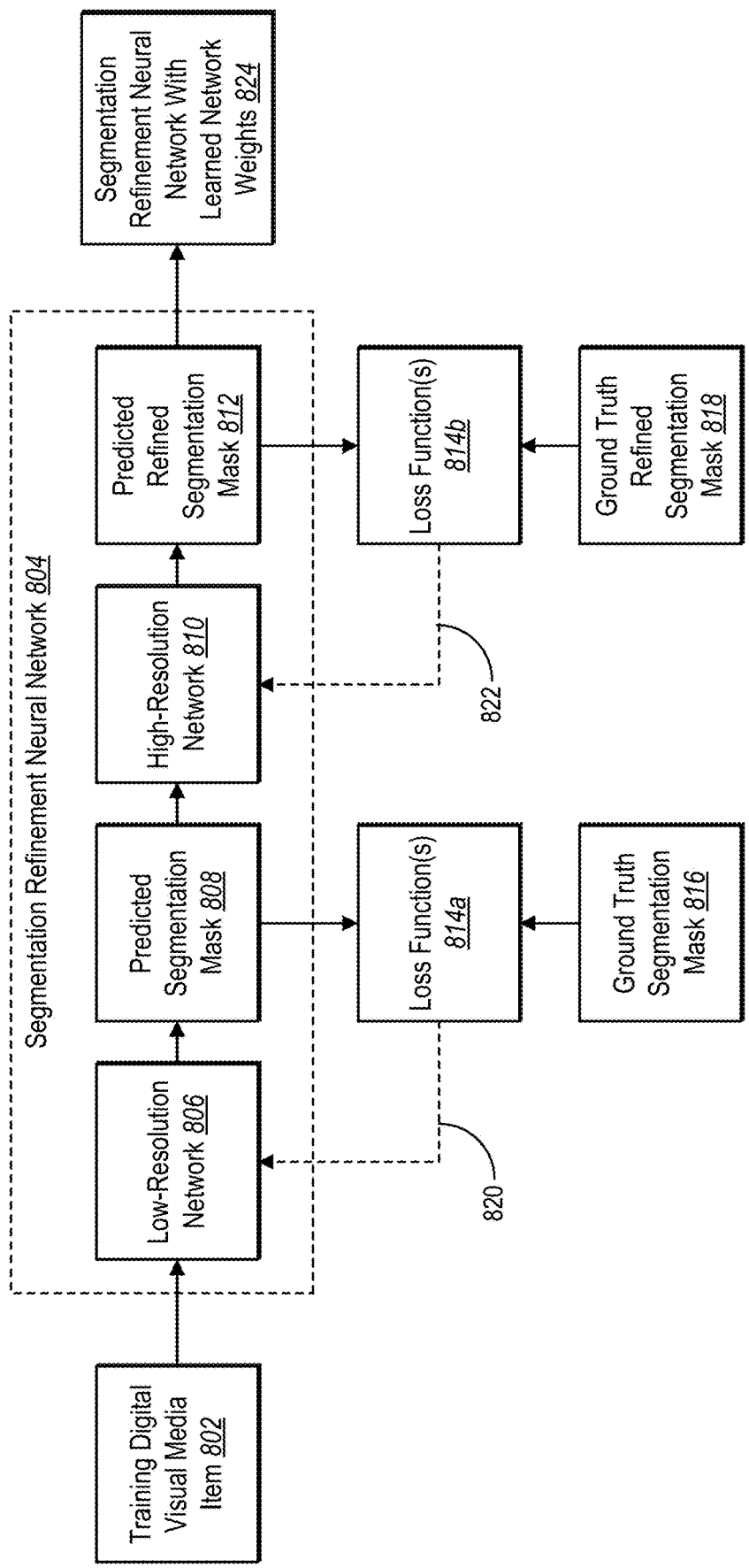
FIG. 8 illustrates a block diagram illustrating a process for training a segmentation refinement neural network in accordance with one or more embodiments.

In one or more embodiments, the meticulous segmentation system 106 trains a segmentation refinement neural network to generate a refined segmentation mask for a digital visual media item. FIG. 8 illustrates a block diagram for training a segmentation refinement neural network in accordance with one or more embodiments.

As shown in FIG. 8, the meticulous segmentation system 106 implements the training by providing a training digital visual media item 802 to the segmentation refinement neural network 804. Further, as shown, the meticulous segmentation system 106 utilizes a low-resolution network 806 of the segmentation refinement neural network 804 to generate a predicted segmentation mask 808. In particular, in some embodiments, the meticulous segmentation system 106 utilizes the low-resolution network 806 to generate the predicted segmentation mask 808 based on a low-resolution copy of the training digital visual media item 802, as discussed above. Additionally, as illustrated, the meticulous segmentation system 106 utilizes a high-resolution network 810 of the segmentation refinement neural network 804 to generate a predicted refined segmentation mask 812 based on the predicted segmentation mask 808 (e.g., based on a resized predicted segmentation mask, as previously discussed).

As illustrated, the meticulous segmentation system 106 utilizes the loss function(s) 814a to determine the loss (i.e., error) resulting from the low-resolution network 806 by comparing the predicted segmentation mask 808 to the ground truth segmentation mask 816. Similarly, the meticulous segmentation system 106 utilizes the loss function(s) 814b to determine the loss (i.e., error) resulting from the high-resolution network 810 by comparing the predicted refined segmentation mask 812 to the ground truth segmentation mask 818. Though FIG. 8 suggests that the meticulous segmentation system 106 only compares the final segmentation masks generated by the low-resolution network 806 and the high-resolution network 810 with a ground truth, the meticulous segmentation system 106 compares the intermediate segmentation masks with ground truths as well in some cases. In other words, in some embodiments, the meticulous segmentation system 106 compares every segmentation mask generated by the hierarchical point-wise refining blocks of the low-resolution network 806 and high-resolution network 810 with a corresponding ground truth to determine a loss.

In one or more embodiments, the loss function(s) 814a and the loss function(s) 814b include the same loss function(s). In some implementations, the loss function(s) 814a and the loss function(s) 814b include a different loss function. In some implementations, the loss function(s) 814a and the loss function(s) 814b include a combination of loss functions. For example, in some cases, the loss function(s) 814a and the loss function(s) 814b include a weighted combination of binary cross entropy (BCE), L1, and L2 losses.

In one or more embodiments, the meticulous segmentation system 106 back propagates the determined losses to the low-resolution network 806 and the high-resolution network 810 (as shown by the dashed lines 820, 822, respectively) to optimize the segmentation refinement neural network 804 by updating its parameters/weights. In particular, the meticulous segmentation system 106 back propagates the determined loss to the hierarchical point-wise refining blocks of the low-resolution network 806 and the high-resolution network 810. Indeed, the meticulous segmentation system 106 updates the parameters/weights to minimize the error of the segmentation refinement neural network 804, such as the error of the hierarchical point-wise refining blocks of the low-resolution network 806 and the high-resolution network 810.

Though FIG. 8 illustrates training the segmentation refinement neural network 804 having one refinement iteration, it should be noted that, in some embodiments, the meticulous segmentation system 106 trains a segmentation refinement neural network using multiple refinement iterations. In one or more embodiments, with each iteration of training, the meticulous segmentation system 106 gradually improves the accuracy with which the segmentation refinement neural network 804 generates refined segmentation masks for digital visual media items (e.g., by lowering the resulting loss value). Indeed, the meticulous segmentation system 106 learns network weights/parameters that can be used to accurately generate the refined segmentation masks. Thus, the meticulous segmentation system 106 generates the segmentation refinement neural network with learned network weights 824.

In some embodiments, while the meticulous segmentation system 106 improves the generation of segmentation masks via training, the meticulous segmentation system 106 utilizes the architecture of the segmentation refinement neural network to improve the identification of pixels for refinement in an unsupervised way. Indeed, as shown above with regard to FIG. 7A, the meticulous segmentation system 106 gradually improves upon the identification of pixels for refinement during the up-sampling process.

Figures 9A, 9B:
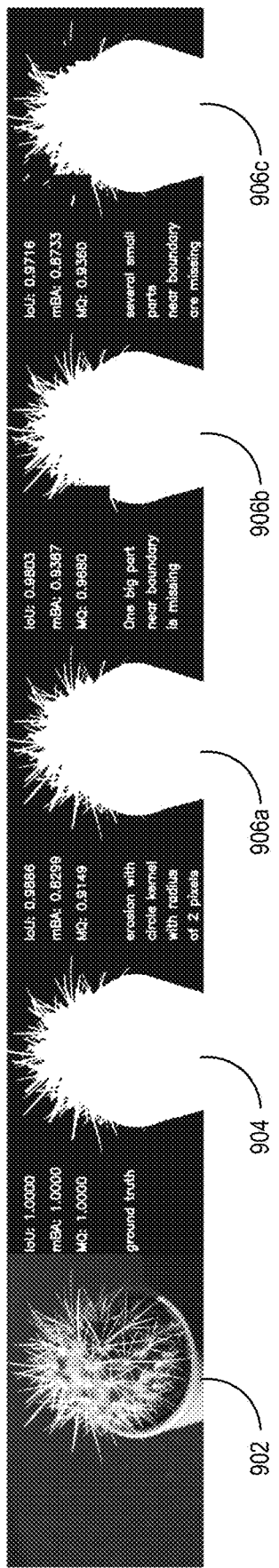
FIGS. 9A-9B illustrate graphical representations reflecting tools used in determining the effectiveness of the meticulous segmentation system in accordance with one or more embodiments.

As mentioned above, in one or more embodiments, the meticulous segmentation system 106 generates more accurate segmentation masks compared to conventional systems, in particular with regard to high-resolution digital visual media items. Researchers have conducted studies to determine the accuracy of one or more embodiments of the meticulous segmentation system 106 in generating refined segmentation masks for digital visual media items. To determine the accuracy of the meticulous segmentation system 106, the researchers established a new metric, the Meticulous Quality (MQ), to measure the quality of boundary segmentation in a moderate way. Further, the researchers established a testing set, MOS600, upon which to test performance of the meticulous segmentation system 106. FIGS. 9A-9B illustrate graphical representations for these tools used in determining the effectiveness of the meticulous segmentation system 106 in accordance with one or more embodiments.

In particular, FIG. 9A illustrates various segmentation masks 906a-906c corresponding to a digital visual media item 902 and their corresponding MQ values. The researchers determined the MQ value of a segmentation as follows:

$$MQ = \frac{1}{2}P_{b_N}^O + \frac{1}{2N}\sum_{i=1}^{N}P_{b_i}^I \quad (1)$$

In equation 1, $P_{b_N}^O$ and $P_{b_i}^I$ represents the pixel accuracy outside and inside the region $b_i$. The second term of equation 1 from the mean Boundary Accuracy (mBA) metric. For a given input image of size w and h, the researchers sampled N radii in $$\left[1, \frac{(w, h)}{300}\right]$$

with uniform intervals $r_1, \ldots r_N$ in ascending order. For each $r_i$, the researchers calculated a boundary region $b_i$ as the difference between the dilation and erosion of the ground truth mask with a circle kernel having a diameter of $2r_i+1$. The researchers calculated the mBA as the average pixel accuracy in these N areas. To measure mBA and MQ, the researchers set N=5. Based on equation 1, a perfect segmentation mask will have MQ=1 (as shown by the ground truth segmentation mask 904).

FIG. 9A provides the mBA metric values and the Intersection over Union (IoU) metric values corresponding to the various illustrated segmentation masks. As shown in FIG. 9A, the segmentation mask 906a includes a segmentation mask that is eroded by two pixels. Accordingly, the mBA value decreases greatly even though the visual quality of the segmentation mask 906a is not affected significantly. The segmentation mask 906b is missing a large portion near the object boundary, affecting the visual quality of the segmentation mask 906b. The IoU value, however, remains near the IoU value of the segmentation mask 906a. A similar effect on the IoU value can be seen with the segmentation mask 906c, which is also missing several portions near the boundary. Accordingly, the researchers used MQ to supplement the insights provided by mBA and IoU and to better reflect the quality of the boundary segmentation.

FIG. 9B illustrates a table comparing the MOS600 dataset with the High-Resolution Salient Object Detection (HRSOD) dataset. The MOS600 dataset includes six hundred high-resolution digital images with complex boundaries. The HRSOD dataset includes 400 annotated high-resolution digital images. The researchers measured the boundary complexity of the images included in each data set using $C_{IPQ}$. To calibrate the process, the researchers cropped the patch including the foreground and resized the patch to be a square before measure the boundary complexity. As can be seen by the table of FIG. 9B, the object boundaries represented in the MOS600 dataset are nine times more complex than those represented in the HRSOD dataset (where a lower $C_{IPQ}$ value indicates a higher complexity).

FIGS. 10A-10B illustrate tables reflecting experimental results regarding the effectiveness of the meticulous segmentation system 106 in accordance with one or more embodiments. In particular, the tables of FIGS. 10A-10B reflect the performance of one embodiment of the meticulous segmentation system 106 that utilizes a low-resolution network of a segmentation refinement network (labeled as "MeticulousNet L") to generate low-resolution segmentation masks. The tables further compare the performance to various state-of-the art salient object detection (SOD) systems. In particular, FIGS. 10A-10B show a comparison with the edge guidance network (EGNet) as described by Zhao et al. in Egnet: Edge Guidance Network For Salient Object Detection, In Proceedings of the IEEE International Conference on Computer Vision, pages 8779-8788, 2019. FIGS. 10A-10B also show a comparison with the multi-scale interactive network (MINet) as described by Pang et al. in Multi-Scale Interactive Network For Salient Object Detection, In Proceedings of the IEEE/CVF Conference on Computer Vision and Pattern Recognition, pages 9413-9422, 2020.

The table of FIG. 10A compares the performances on the HRSOD dataset, and the table of FIG. 10B compares the performances on the MOS600 dataset. In measuring the performances of the models, the researchers resized HRSOD and MOS600 to 360×360. As further shown, the tables of FIGS. 10A-10B measure the performances of each model using mean absolute error (MAE), shape measure (S-m), IoU, mBA, and MQ. The arrows appearing next to each metric indicates how the metric is to be interpreted. For example, the down-pointing arrow next to MAE indicates that a lower MAE value indicates a more accurate segmentation according to that metric.

As shown by the table of FIG. 10A, the meticulous segmentation system 106 outperformed the other two models in nearly every metric when applied to the HRSOD dataset. In the only metric that the meticulous segmentation system 106 does not provide the best value (i.e., mBA), the performance of the meticulous segmentation system 106 is still comparable with the top performer in that metric. As further shown by the table of FIG. 10B, the meticulous segmentation system 106 outperformed the other two models in every metric when applied to the MOS600 dataset, performing significantly better in many metrics. This is notable considering the significantly greater boundary complexity represented in the MOS600 dataset.

FIG. 11 illustrates another table reflecting additional experimental results regarding the effectiveness of the meticulous segmentation system 106 in accordance with one or more embodiments. In particular, the table of FIG. 11 reflects the performance of one embodiment of the meticulous segmentation system 106 that utilizes a segmentation refinement network having a low-resolution network and a high-resolution network (labeled as "MeticulousNet_ (L+H)") to generate refined segmentation masks.

The table of FIG. 11 compares the performance of the meticulous segmentation system 106 to the EGNet and MINet models on HRSOD and MOS600 datasets. The researchers utilized the EGNet and MINet models to predict coarse segmentation masks as a baseline. The researchers further utilized a cascade pyramid scene parsing (CascadePSP) network to perform refinements on the predicted coarse segmentation masks. The CascadePSP network is described by Cheng et al. in Cascadepsp: Toward Class-Agnostic And Very High-Resolution Segmentation Via Global And Local Refinement, In Proceedings of the IEEE/CVF Conference on Computer Vision and Pattern Recognition, pages 8890-8899, 2020. The researchers trained the high-resolution network of the meticulous segmentation system 106 partly based on binarized data from the DIM dataset. Accordingly, the researchers trained iterations of the CascadePSP network partly based on the binarized data from the DIM dataset (CascadePSP*). The researchers further used a series of additional networks (labeled as "GSN+APS+LRN+GLFN") as an additional baseline. In this additional baseline, the table of FIG. 11 only reflects performance on the HRSOD dataset.

The results shown by the table of FIG. 11 are similar to those shown by the tables of FIGS. 10A-10B where the meticulous segmentation system 106 outperforms the other models according to the MAE, S-m, mBA, and MQ metrics when applied to both datasets, outperforms the other models according to the IoU metric when applied to the MOS600 dataset, and performs comparably to the highest performer according the IoU metric when applied to the HRSOD dataset. Accordingly, in many instances, the meticulous segmentation system 106 generates more accurate segmentation masks when compared to conventional systems, especially when generating segmentation masks for high-resolution digital visual media items having complex object boundaries.

The researchers also performed ablation studies to establish the contribution of various components of the meticulous segmentation system 106. In particular, a base network comprising the segmentation refinement neural network 400 without the HierPR blocks and without the recursive process, the base network combined with the HierPR, the base network combined with the recursive process, and the entire segmentation refinement neural network 400. The addition of the HierPR to the base network increases both IoU, mBA, and MQ by 0.17%, 1.45% and 0.69% respectively with the major improvements are on the boundary segmentation. The addition of the recursive process without the HierPR improves mBA by 1.24%, leading to an increase of 0.58% in MQ. The entire segmentation refinement neural network 400 provides large improvements in the object body segmentation. In particular, the segmentation refinement neural network 400 increases IoU by 2.01%, which is not expected when analyzing the HierPR and the recursive structures separately. This indicates HierPR and recursive processes complement each other and provide synergies. Together the HierPR and recursive processes also increase mBA and MQ by 1.93% and 1.12%, respectively.

Figure 12:
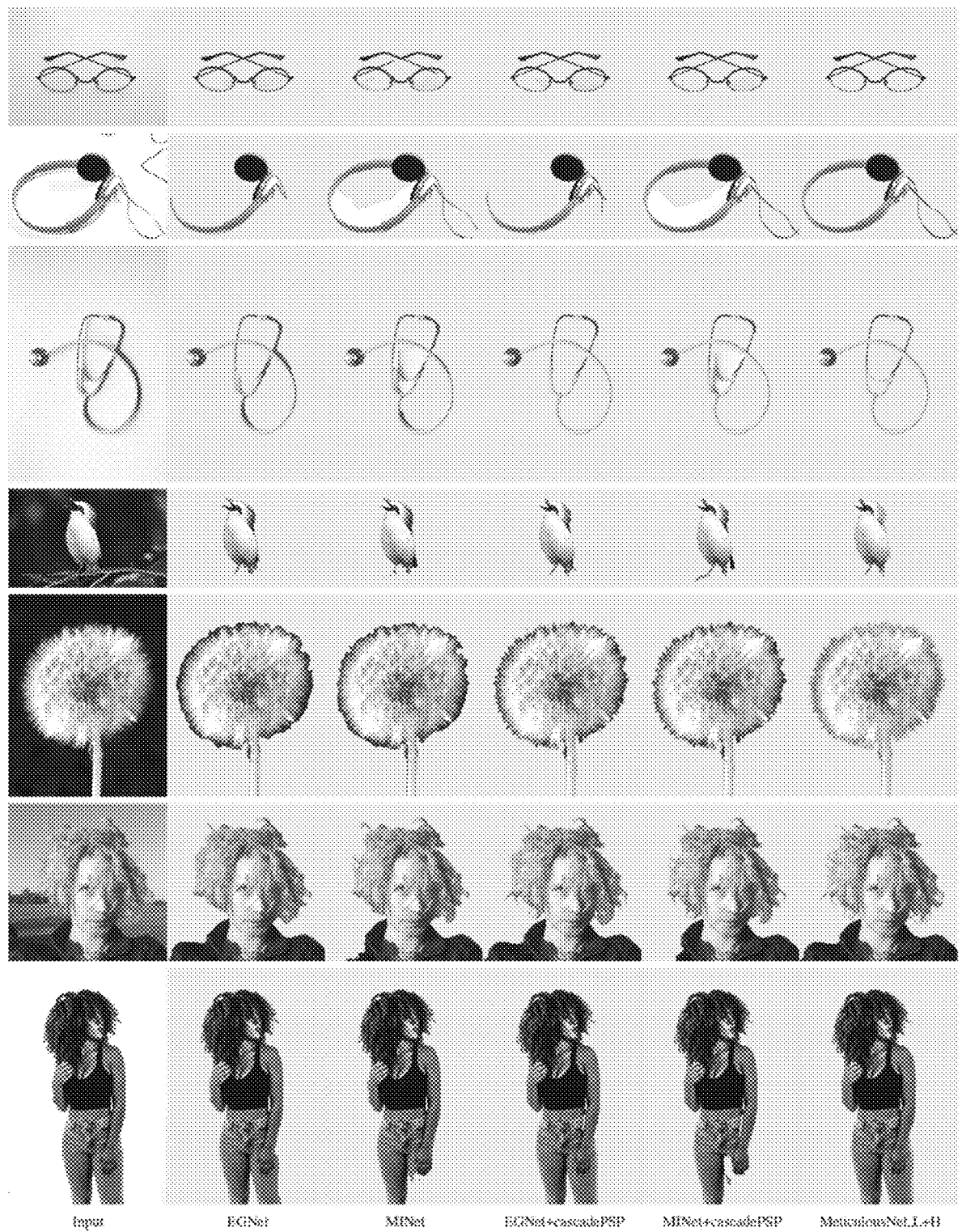
FIG. 12 illustrates graphical representations reflecting additional experimental results regarding the effectiveness of the meticulous segmentation system in accordance with one or more embodiments.

FIG. 12 illustrates graphical representations reflecting additional experimental results regarding the effectiveness of the meticulous segmentation system 106 in accordance with one or more embodiments. Indeed, the graphical representations of FIG. 12 compare segmentation masks generated by one embodiment of the meticulous segmentation system 106 for various digital visual media items with segmentation masks generated by various other models.

As shown by the graphical representations of FIG. 12, the meticulous segmentation system 106 generates segmentation masks that more accurately distinguish between the objects and backgrounds depicted in the digital visual media items. In particular, the meticulous segmentation system 106 performs more accurate segmentation when complex object boundaries are involved, such as the pappi of a dandelion or human hair. Accordingly, the meticulous segmentation system 106 operates more accurately to generate segmentation masks for high-resolution digital visual media items that depict complex object boundaries with high clarity.

Figure 13:
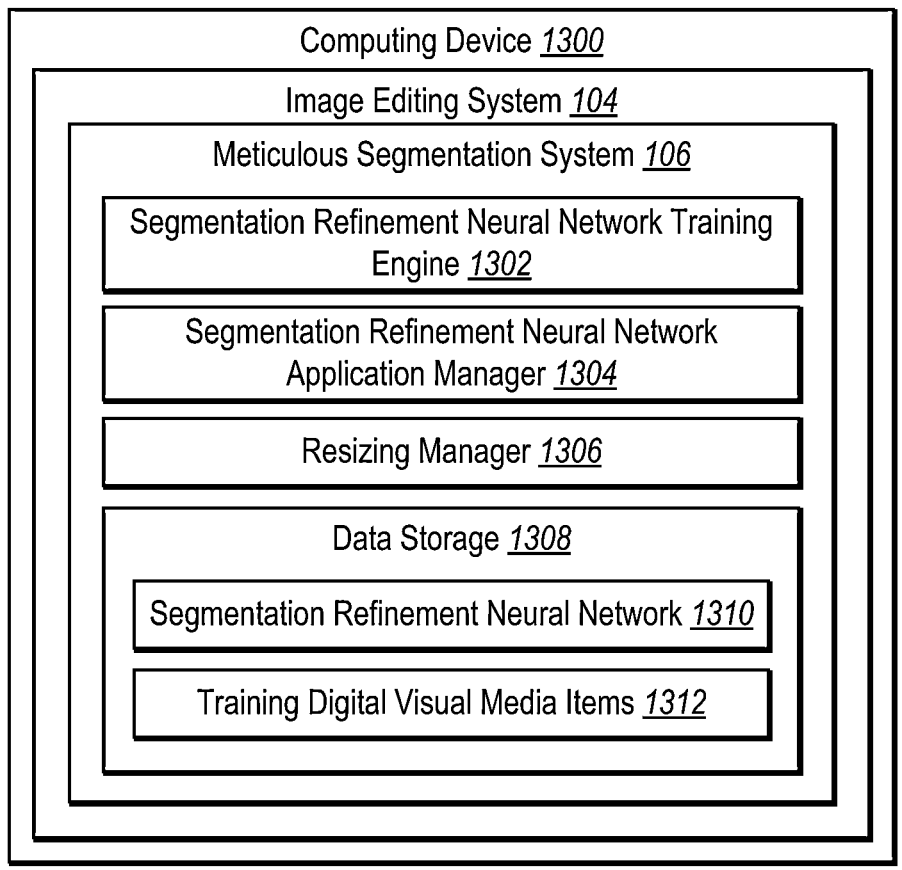
FIG. 13 illustrates an example schematic diagram of a meticulous segmentation system in accordance with one or more embodiments.

Turning now to FIG. 13, additional detail will now be provided regarding various components and capabilities of the meticulous segmentation system 106. In particular, FIG. 13 illustrates the meticulous segmentation system 106 implemented by the computing device 1300 (e.g., the server(s) 102 and/or one of the client devices 110a-110n discussed above with reference to FIG. 1). Additionally, the meticulous segmentation system 106 is also part of the image editing system 104. As shown, in one or more embodiments, the meticulous segmentation system 106 includes, but is not limited to, a segmentation refinement neural network training engine 1302, a segmentation refinement neural network application manager 1304, a resizing manager 1306, and data storage 1308 (which includes the segmentation refinement neural network 1310 and training digital visual media items 1312).

As just mentioned, and as illustrated in FIG. 13, the meticulous segmentation system 106 includes the segmentation refinement neural network training engine 1302. In one or more embodiments, the segmentation refinement neural network training engine 1302 trains a segmentation refinement neural network to generate refined segmentations masks for digital visual media items. For example, in some implementations, the segmentation refinement neural network training engine 1302 utilizes training digital visual media items and corresponding ground truth segmentation masks to train the segmentation refinement neural network to generate refined segmentation masks. Indeed, in some implementations, the segmentation refinement neural network learns network weights/parameters during the training process.

As further shown in FIG. 13, the meticulous segmentation system 106 includes the segmentation refinement neural network application manager 1304. In one or more embodiments, the segmentation refinement neural network application manager 1304 utilizes the segmentation refinement neural network trained by the segmentation refinement neural network training engine 1302 to generate refined segmentation masks for digital visual media items. For example, for a given digital visual media item, the segmentation refinement neural network application manager 1304 utilizes a low-resolution network of the segmentation refinement neural network to generate a low-resolution segmentation mask. Further, the segmentation refinement neural network application manager 1304 utilizes a high-resolution network to generate a high-resolution segmentation mask based on the low-resolution segmentation mask, where the high-resolution segmentation mask includes the original resolution of the digital visual media item.

Additionally, as shown in FIG. 13, the meticulous segmentation system 106 includes the resizing manager 1306. In one or more embodiments, the resizing manager 1306 resizes a digital visual media item for processing by the segmentation refinement neural network. For example, in one or more embodiments, the resizing manager 1306 generates a low-resolution copy of a digital visual media item and provides the low-resolution copy to a low-resolution network of the segmentation refinement neural network. Further, in some cases, the resizing manager 1306 resizes a low-resolution segmentation mask generated by the low-resolution network of the segmentation refinement neural network and provides the resized low-resolution segmentation mask to a high-resolution network of the segmentation refinement neural network.

Further, as shown in FIG. 13, the meticulous segmentation system 106 includes data storage 1308. In particular, data storage 1308 includes the segmentation refinement neural network 1310 and training digital visual media items 1312. In one or more embodiments, the segmentation refinement neural network 1310 stores the segmentation refinement neural network trained by the segmentation refinement neural network training engine 1302 and used by the segmentation refinement neural network application manager 1304. In some embodiments, training digital visual media items 1312 stores training digital visual media items used by the segmentation refinement neural network training engine 1302 to train the segmentation refinement neural network. Though not shown in FIG. 13, in some implementations, training digital visual media items 1312 further stores the ground truth segmentation masks corresponding to the stored training digital visual media items.

Each of the components 1302-1312 of the meticulous segmentation system 106 can include software, hardware, or both. For example, the components 1302-1312 can include one or more instructions stored on a computer-readable storage medium and executable by processors of one or more computing devices, such as a client device or server device. When executed by the one or more processors, the computer-executable instructions of the meticulous segmentation system 106 can cause the computing device(s) to perform the methods described herein. Alternatively, the components 1302-1312 can include hardware, such as a special-purpose processing device to perform a certain function or group of functions. Alternatively, the components 1302-1312 of the meticulous segmentation system 106 can include a combination of computer-executable instructions and hardware.

Furthermore, the components 1302-1312 of the meticulous segmentation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1302-1312 of the meticulous segmentation system 106 may be implemented as a stand-alone application, such as a desktop or mobile application. Furthermore, the components 1302-1312 of the meticulous segmentation system 106 may be implemented as one or more web-based applications hosted on a remote server. Alternatively, or additionally, the components 1302-1312 of the meticulous segmentation system 106 may be implemented in a suite of mobile device applications or "apps." For example, in one or more embodiments, the meticulous segmentation system 106 can comprise or operate in connection with digital software applications such as ADOBE® ILLUSTRATOR® or ADOBE® PHOTOSHOP®. "ADOBE," "ILLUSTRATOR," and "PHOTOSHOP" are either registered trademarks or trademarks of Adobe Inc. in the United States and/or other countries.

Figure 14:
FIG. 14 illustrates a flowchart of a series of acts for generating a refined segmentation mask for a digital visual media item using a segmentation refinement neural network in accordance with one or more embodiments.

FIGS. 1-13, the corresponding text and the examples provide a number of different methods, systems, devices, and non-transitory computer-readable media of the meticulous segmentation system 106. In addition to the foregoing, one or more embodiments can also be described in terms of flowcharts comprising acts for accomplishing the particular result, as shown in FIG. 14. FIG. 14 may be performed with more or fewer acts. Further, the acts may be performed in different orders. Additionally, the acts described herein may be repeated or performed in parallel with one another or in parallel with different instances of the same or similar acts.

FIG. 14 illustrates a flowchart of a series of acts 1400 for generating a refined segmentation mask for a digital visual media item using a segmentation refinement neural network in accordance with one or more embodiments. While FIG. 14 illustrates acts according to one embodiment, alternative embodiments may omit, add to, reorder, and/or modify any of the acts shown in FIG. 14. In some implementations, the acts of FIG. 14 are performed as part of a method. For example, in some embodiments, the acts of FIG. 14 are performed, in a digital medium environment for editing digital visual media, as part of a computer-implemented method for generating segmentation masks. Alternatively, a non-transitory computer-readable medium can store instructions thereon that, when executed by at least one processor, cause a computing device to perform the acts of FIG. 14. In some embodiments, a system performs the acts of FIG. 14. For example, in one or more embodiments, a system includes at least one memory device comprising a segmentation refinement neural network. The system further includes at least one computing device configured to cause the system to perform the acts of FIG. 14.

The series of acts 1400 includes an act 1402 of extracting encoded feature maps from a digital visual media item. For example, in some embodiments, the act 1402 involves generating, utilizing a segmentation refinement neural network, a refined segmentation mask for a digital visual media item depicting one or more objects by extracting, utilizing an encoder, encoded feature maps from the digital visual media item.

The series of acts 1400 also includes an act 1404 of generating decoded feature maps based on the encoded feature maps. For example, in some implementations, the acts 1404 involves generating, utilizing the segmentation refinement neural network, the refined segmentation mask for the digital visual media item depicting the one or more objects by further generating, utilizing a deconvolution branch of a recursive decoder, decoded feature maps based on the encoded feature maps.

Additionally, the series of acts 1400 includes an act 1406 of generating a refined segmentation mask based on the encoded feature maps and the decoded feature maps. For example, in some cases, the act 1406 involves generating, utilizing the segmentation refinement neural network, the refined segmentation mask for the digital visual media item depicting the one or more objects by further generating, utilizing a hierarchy of hierarchical point-wise refining blocks corresponding to a refinement branch of the recursive decoder, the refined segmentation mask by recursively refining an initial segmentation mask corresponding to the digital visual media item based on the encoded feature maps and the decoded feature maps.

In one or more embodiments, generating, utilizing the hierarchy of hierarchical point-wise refining blocks, the refined segmentation mask comprises: generating, utilizing a first hierarchical point-wise refining block, an uncertainty map based on a decoded feature map from the decoded feature maps; and generating, utilizing the first hierarchical point-wise refining block, the initial segmentation mask for the digital visual media item based on the uncertainty map and an encoded feature map from the encoded feature maps. In some cases, the meticulous segmentation system 106 further generates, utilizing a second hierarchical point-wise refining block, an additional segmentation mask based on an additional decoded feature map from the decoded feature maps and an additional encoded feature map from the encoded feature maps; and determines, utilizing a mask encoding layer of the refinement branch, encodings of coarse-to-fine variations based on the initial segmentation mask and the additional segmentation mask.

In one or more embodiments, the meticulous segmentation system 106 further generates, utilizing the hierarchy of hierarchical point-wise refining blocks, the refined segmentation mask by recursively up-sampling the initial segmentation mask while recursively refining the initial segmentation mask so that a size of the refined segmentation mask is greater than a size of the initial segmentation mask. To illustrate, in one or more embodiments, the meticulous segmentation system 106 generates the initial segmentation mask using a first hierarchical point-wise refining block. Accordingly, the meticulous segmentation system 106 recursively up-samples the initial segmentation mask while recursively refining the initial segmentation mask by: generating, utilizing a first up-sampling cycle comprising a first set of hierarchical point-wise refining blocks, a first up-sampled segmentation mask comprising a first set of refinements to the initial segmentation mask; generating, utilizing a second up-sampling cycle comprising a second set of hierarchical point-wise refining blocks, a second up-sampled segmentation mask comprising a second set of refinements based on the first up-sampled segmentation mask; and generating, utilizing a third up-sampling cycle comprising a third set of hierarchical point-wise refining blocks, a third up-sampled segmentation mask comprising a third set of refinements based on the second up-sampled segmentation mask, the refined segmentation mask comprising the third up-sampled segmentation mask.

In some implementations, the meticulous segmentation system 106 provides feature values generated by a first hierarchical point-wise refining block of the hierarchy of hierarchical point-wise refining blocks to a plurality of additional hierarchical point-wise refining blocks of the hierarchy of hierarchical point-wise refining blocks via one or more skip connections. Accordingly, in one or more embodiments, the meticulous segmentation system 106 generates, utilizing the hierarchy of hierarchical point-wise refining blocks, the refined segmentation mask by generating, utilizing the hierarchy of hierarchical point-wise refining blocks, the refined segmentation mask based on the encoded feature maps, the decoded feature maps, and the feature values generated by the first hierarchical point-wise refining block.

In some cases, the meticulous segmentation system 106 utilizes a segmentation refinement neural network that includes a low-resolution network and a high-resolution network to generate the refined segmentation mask. For example, in some instances, the meticulous segmentation system 106 generates a low-resolution copy of the digital visual media item, the low-resolution copy comprising a resolution that is lower than an original resolution of the digital visual media item. Accordingly, in such instances, generating, utilizing the segmentation refinement neural network, the refined segmentation mask for the digital visual media item comprises generating, utilizing a low-resolution network of the segmentation refinement neural network and based on the low-resolution copy of the digital visual media item, a low-resolution segmentation mask comprising the resolution that is lower than the original resolution of the digital visual media item.

Further, in some implementations, the meticulous segmentation system 106 resizes the low-resolution segmentation mask to include the original resolution of the digital visual media item; and generates, utilizing a high-resolution network of the segmentation refinement neural network, a high-resolution segmentation mask based on the resized low-resolution segmentation mask, the high-resolution segmentation mask comprising the original resolution of the digital visual media item. In one or more embodiments, generating, utilizing the high-resolution network of the segmentation refinement neural network, the high-resolution segmentation mask based on the resized low-resolution segmentation mask comprises: determining one or more patches corresponding to the digital visual media item; and generating the high-resolution segmentation mask based on the resized low-resolution segmentation mask and the one or more patches corresponding to the digital visual media item.

To illustrate, in one or more embodiments, the meticulous segmentation system 106 determines a digital visual media item depicting one or more objects and extracts, utilizing an encoder of a segmentation refinement neural network, encoded feature maps from the digital visual media item. Further, the meticulous segmentation system 106 generate, utilizing a recursive decoder of the segmentation refinement neural network, an initial segmentation mask for the digital visual media item by: determining, utilizing one or more deconvolution layers, a first decoded feature map based on a first encoded feature map from the encoded feature maps; generating, utilizing a hierarchical point-wise refining block, an uncertainty map based on the first decoded feature map, the uncertainty map indicating pixels having an associated uncertainty that the pixels correspond to the one or more objects or do not correspond to the one or more objects; and determining, utilizing the hierarchical point-wise refining block, the initial segmentation mask for the digital visual media item based on the uncertainty map, the first decoded feature map, and a second encoded feature map from the encoded feature maps.

In some cases, the meticulous segmentation system 106 further generates, utilizing the recursive decoder of the segmentation refinement neural network, a refined segmentation mask for the digital visual media item by recursively refining the initial segmentation mask utilizing a hierarchy of additional hierarchical point-wise refining blocks. In some cases, recursively refining the initial segmentation mask utilizing the hierarchy of additional hierarchical point-wise refining blocks comprises generating, utilizing an additional hierarchical point-wise refining block, an additional segmentation mask by reclassifying one or more pixels of the initial segmentation mask.

In some implementations, the meticulous segmentation system 106 further generates, utilizing a mask encoding layer of the recursive decoder, encodings of coarse-to-fine variations based on the initial segmentation mask and the additional segmentation mask; and determines, utilizing the one or more deconvolution layers, a second decoded feature map based on at least one encoded feature map and the encodings of the coarse-to-fine variations.

Indeed, in one or more embodiments, the meticulous segmentation system 106 utilizes a segmentation refinement neural network to generate refined segmentation masks for digital visual media items. In some embodiments, the segmentation refinement neural network includes an encoder that extracts encoded feature maps from a digital visual media item. Further, the segmentation refinement neural network includes a recursive decoder that generates a refined segmentation mask for the digital visual media item based on the encoded feature maps, the recursive decoder comprising: a deconvolution branch that generates decoded feature maps based on the encoded feature maps; and a refinement branch comprising a hierarchy of hierarchical point-wise refining blocks that generate, based on the encoded feature maps and the decoded feature maps, the refined segmentation mask by recursively refining an initial segmentation mask corresponding to the digital visual media item.

In some cases, the segmentation refinement neural network includes a low-resolution network comprising the encoder and the recursive decoder. The segmentation refinement neural network further includes a high-resolution network comprising: an additional encoder that extracts additional encoded feature maps from the refined segmentation mask; and an additional recursive decoder that generates an additional refined segmentation mask for the digital visual media item based on the additional encoded feature maps. In some implementations, the additional recursive decoder comprises: an additional deconvolution branch that generates additional decoded feature maps based on the additional encoded feature maps; and an additional refinement branch comprising an additional hierarchy of hierarchical point-wise refining blocks that generate, based on the additional encoded feature maps and the additional decoded feature maps.

In some embodiments, the refinement branch of the recursive decoder comprises a mask encoding layer that generates coarse-to-fine variations based on segmentation masks generated by the hierarchy of hierarchical point-wise refining blocks and provides the coarse-to-fine variations to the deconvolution branch. Additionally, in some cases, the segmentation refinement neural network comprises a first set of skip connections that connect deconvolutional layers of the deconvolution branch to at least one layer of the encoder and a first hierarchical point-wise refining block of the hierarchy of hierarchical point-wise refining blocks. Further, in some instances, the segmentation refinement neural network comprises a second set of skip connections that connect other hierarchical point-wise refining blocks of the hierarchy of hierarchical point-wise refining blocks to the first hierarchical point-wise refining block.

Accordingly, in some implementations, the series of acts 1400 includes acts for utilizing the segmentation refinement neural network. For example, in some cases, the acts include receive, at the segmentation refinement neural network, at least one digital visual media item; and generate, utilizing the segmentation refinement neural network, at least one refined segmentation mask for the at least one digital visual media item.

In some embodiments, the series of acts 1400 include acts for modifying a digital visual media item. For example, in some cases, the acts include modifying the digital visual media item based on the refined segmentation mask. For instances, in some instances, the meticulous segmentation system 106 applies a filter or effect to the digital visual media item or modifies a background depicted in the digital visual media item.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
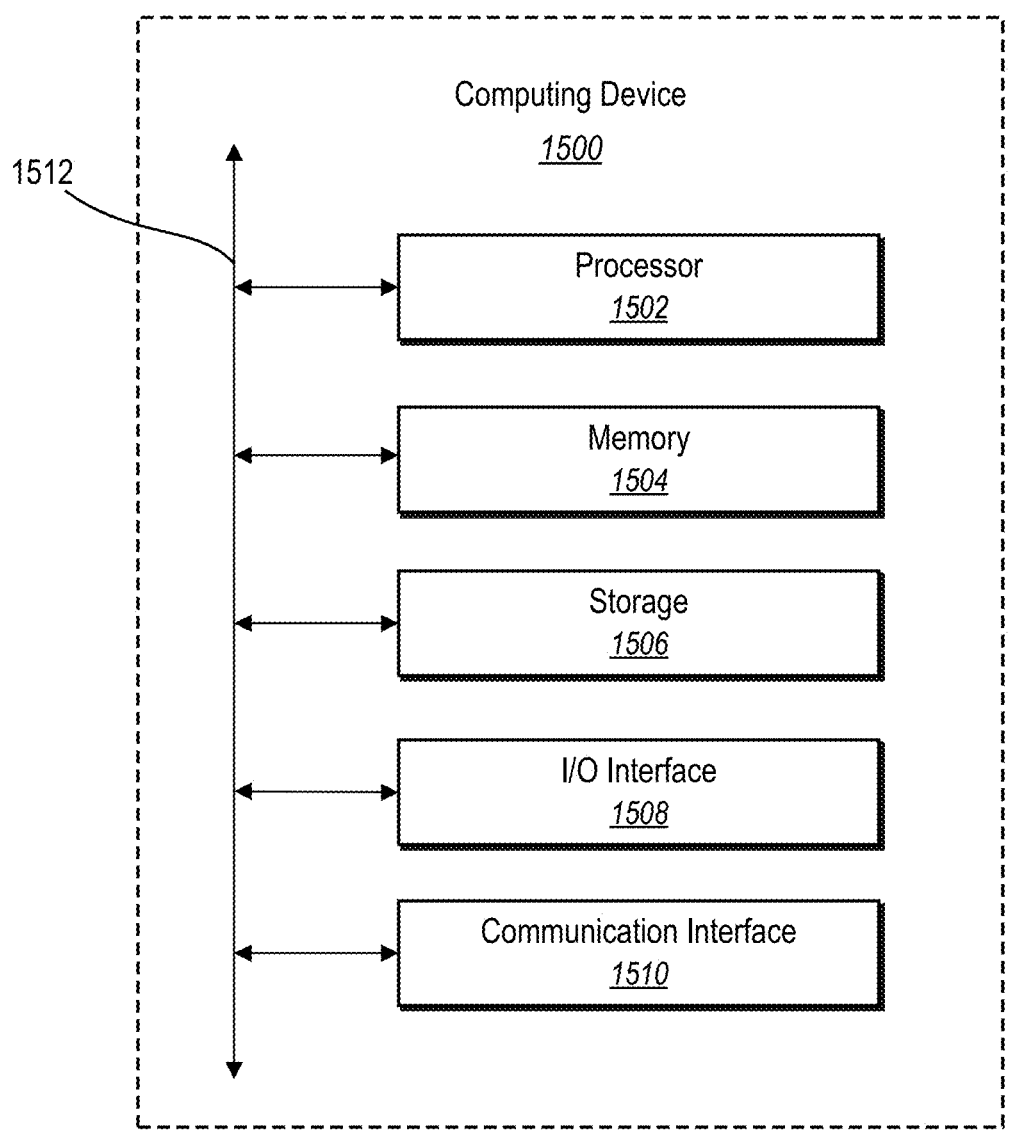
FIG. 15 illustrates a block diagram of an exemplary computing device in accordance with one or more embodiments.

FIG. 15 illustrates a block diagram of an example computing device 1500 that may be configured to perform one or more of the processes described above. One will appreciate that one or more computing devices, such as the computing device 1500 may represent the computing devices described above (e.g., the server(s) 102 and/or the client devices 110a-110n). In one or more embodiments, the computing device 1500 may be a mobile device (e.g., a mobile telephone, a smartphone, a PDA, a tablet, a laptop, a camera, a tracker, a watch, a wearable device). In some embodiments, the computing device 1500 may be a non-mobile device (e.g., a desktop computer or another type of client device). Further, the computing device 1500 may be a server device that includes cloud-based processing and storage capabilities.

As shown in FIG. 15, the computing device 1500 can include one or more processor(s) 1502, memory 1504, a storage device 1506, input/output interfaces 1508 (or "I/O interfaces 1508"), and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other embodiments. Furthermore, in certain embodiments, the computing device 1500 includes fewer components than those shown in FIG. 15. Components of the computing device 1500 shown in FIG. 15 will now be described in additional detail.

In particular embodiments, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 including storage for storing data or instructions. As an example, and not by way of limitation, the storage device 1506 can include a non-transitory storage medium described above. The storage device 1506 may include a hard disk drive (HDD), flash memory, a Universal Serial Bus (USB) drive or a combination these or other storage devices.

As shown, the computing device 1500 includes one or more I/O interfaces 1508, which are provided to allow a user to provide input to (such as user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of such I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can include hardware, software, or both that connects components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for editing digital visual media, a computer-implemented method for generating segmentation masks comprising:
    generating, utilizing a segmentation refinement neural network, a refined segmentation mask for a digital visual media item depicting one or more objects by:
        extracting, utilizing a shared encoder, encoded feature maps from the digital visual media item;
        generating, utilizing a deconvolution branch of a recursive decoder, decoded feature maps based on the encoded feature maps; and
        generating, utilizing a hierarchy of hierarchical point-wise refining blocks corresponding to a refinement branch of the recursive decoder, the refined segmentation mask by:
            generating, utilizing a first hierarchical point-wise refining block, an initial segmentation mask for the digital visual media item based on at least one encoded feature map from the shared encoder and at least one decoded feature map from the deconvolution branch; and
            recursively refining the initial segmentation mask utilizing additional hierarchical point-wise refining blocks based on additional encoded feature maps from the shared encoder and additional decoded feature maps from the deconvolution branch,
        wherein the recursively refining comprises refining the initial segmentation mask by each of the additional hierarchical point-wise refining blocks, and
        wherein encodings of coarse-to-fine variations generated via the additional hierarchical point-wise refining blocks are provided back to the deconvolution branch such that at least some of the additional decoded feature maps are generated based on the generated encodings of coarse-to-fine variations.

2. The computer-implemented method of claim 1, wherein generating, utilizing the hierarchy of hierarchical point-wise refining blocks, the refined segmentation mask comprises:
    generating, utilizing the first hierarchical point-wise refining block, an uncertainty map based on a decoded feature map from the at least one decoded feature map; and
    generating, utilizing the first hierarchical point-wise refining block, the initial segmentation mask for the digital visual media item based on the uncertainty map and an encoded feature map from the at least one encoded feature map.

3. The computer-implemented method of claim 2, wherein recursively refining the initial segmentation mask utilizing the additional hierarchical point-wise refining blocks comprises:
    generating, utilizing a second hierarchical point-wise refining block, an additional segmentation mask based on an additional decoded feature map from the decoded feature maps and an additional encoded feature map from the encoded feature maps; and
    determining, utilizing a mask encoding layer of the refinement branch, one or more encodings of coarse-to-fine variations based on the initial segmentation mask and the additional segmentation mask.

4. The computer-implemented method of claim 1, further comprising generating, utilizing the hierarchy of hierarchical point-wise refining blocks, the refined segmentation mask by recursively up-sampling the initial segmentation mask while recursively refining the initial segmentation mask so that a size of the refined segmentation mask is greater than a size of the initial segmentation mask.

5. The computer-implemented method of claim 4, wherein recursively up-sampling the initial segmentation mask while recursively refining the initial segmentation mask comprises:
    generating, utilizing a first up-sampling cycle comprising a first set of hierarchical point-wise refining blocks, a first up-sampled segmentation mask comprising a first set of refinements to the initial segmentation mask;
    generating, utilizing a second up-sampling cycle comprising a second set of hierarchical point-wise refining blocks, a second up-sampled segmentation mask comprising a second set of refinements based on the first up-sampled segmentation mask; and
    generating, utilizing a third up-sampling cycle comprising a third set of hierarchical point-wise refining blocks, a third up-sampled segmentation mask comprising a third set of refinements based on the second up-sampled segmentation mask, the refined segmentation mask comprising the third up-sampled segmentation mask.

6. The computer-implemented method of claim 1, further comprising providing feature values generated by the first hierarchical point-wise refining block of the hierarchy of hierarchical point-wise refining blocks to the additional hierarchical point-wise refining blocks of the hierarchy of hierarchical point-wise refining blocks via one or more skip connections,
    wherein recursively refining the initial segmentation mask utilizing the additional hierarchical point-wise refining blocks comprises recursively refining the initial segmentation mask utilizing the additional hierarchical point-wise refining blocks based on the encoded feature maps, the decoded feature maps, and the feature values generated by the first hierarchical point-wise refining block.

7. The computer-implemented method of claim 1, further comprising generating a low-resolution copy of the digital visual media item, the low-resolution copy comprising a resolution that is lower than an original resolution of the digital visual media item, wherein, generating, utilizing the segmentation refinement neural network, the refined segmentation mask for the digital visual media item comprises generating, utilizing a low-resolution network of the segmentation refinement neural network and based on the low-resolution copy of the digital visual media item, a low-resolution segmentation mask comprising the resolution that is lower than the original resolution of the digital visual media item.

8. The computer-implemented method of claim 7, further comprising:
resizing the low-resolution segmentation mask to include the original resolution of the digital visual media item; and
generating, utilizing a high-resolution network of the segmentation refinement neural network, a high-resolution segmentation mask based on the resized low-resolution segmentation mask, the high-resolution segmentation mask comprising the original resolution of the digital visual media item.

9. The computer-implemented method of claim 8, wherein generating, utilizing the high-resolution network of the segmentation refinement neural network, the high-resolution segmentation mask based on the resized low-resolution segmentation mask comprises:
determining one or more patches corresponding to the digital visual media item; and
generating the high-resolution segmentation mask based on the resized low-resolution segmentation mask and the one or more patches corresponding to the digital visual media item.

10. The computer-implemented method of claim 1, further comprising modifying the digital visual media item based on the refined segmentation mask.

11. A system comprising:
at least one memory device comprising a segmentation refinement neural network comprising:
a shared encoder that extracts encoded feature maps from a digital visual media item; and
a recursive decoder that generates a refined segmentation mask for the digital visual media item based on the encoded feature maps, the recursive decoder comprising:
a deconvolution branch that generates decoded feature maps based on the encoded feature maps; and
a refinement branch comprising a hierarchy of hierarchical point-wise refining blocks having:
a first hierarchical point-wise refining block that generates an initial segmentation mask corresponding to the digital visual media item based on at least one encoded feature map from the shared encoder and at least one decoded feature map from the deconvolution branch; and
additional hierarchical point-wise refining blocks that generate, based on additional encoded feature maps from the shared encoder and additional decoded feature maps from the deconvolution branch, the refined segmentation mask by recursively refining the initial segmentation mask corresponding to the digital visual media item,
wherein the recursively refining comprises refining the initial segmentation mask by each of the additional hierarchical point-wise refining blocks, and
wherein encodings of coarse-to-fine variations generated via the additional hierarchical point-wise refining blocks are provided back to the deconvolution branch such that at least some of the additional decoded feature maps are generated based on the generated encodings of coarse-to-fine variations; and
at least one computing device configured to cause the system to:
receive, at the segmentation refinement neural network, at least one digital visual media item; and
generate, utilizing the segmentation refinement neural network, one or more refined segmentation masks for the at least one digital visual media item.

12. The system of claim 11, wherein the segmentation refinement neural network comprises:
a low-resolution network comprising the shared encoder and the recursive decoder; and
a high-resolution network comprising:
an additional shared encoder that extracts additional encoded feature maps from the refined segmentation mask; and
an additional recursive decoder that generates an additional refined segmentation mask for the digital visual media item based on the additional encoded feature maps.

13. The system of claim 12, wherein the additional recursive decoder comprises:
an additional deconvolution branch that generates additional decoded feature maps based on the additional encoded feature maps; and
an additional refinement branch comprising an additional hierarchy of hierarchical point-wise refining blocks that generate, based on the additional encoded feature maps and the additional decoded feature maps, the additional refined segmentation mask.

14. The system of claim 11, wherein:
the hierarchy of hierarchical point-wise refining blocks of the refinement branch generates a plurality of segmentation masks including the initial segmentation mask and the refined segmentation mask; and
the refinement branch of the recursive decoder comprises a mask encoding layer that generates coarse-to-fine variations based on at least one segmentation mask of the plurality of segmentation masks generated by the hierarchy of hierarchical point-wise refining blocks and provides the coarse-to-fine variations to the deconvolution branch.

15. The system of claim 11, wherein the segmentation refinement neural network comprises a first set of skip connections that connect deconvolutional layers of the deconvolution branch to at least one layer of the shared encoder and the first hierarchical point-wise refining block of the hierarchy of hierarchical point-wise refining blocks.

16. The system of claim 15, wherein the segmentation refinement neural network comprises a second set of skip connections that connect the additional hierarchical point-wise refining blocks of the hierarchy of hierarchical point-wise refining blocks to the first hierarchical point-wise refining block.

17. A non-transitory computer-readable medium storing instructions thereon that, when executed by at least one processor, cause a computing device to:
determine a digital visual media item depicting one or more objects;
extract, utilizing a shared encoder of a segmentation refinement neural network, encoded feature maps from the digital visual media item;

generate, utilizing a recursive decoder of the segmentation refinement neural network, an initial segmentation mask for the digital visual media item by:
  providing the encoded feature maps generated by the shared encoder to a deconvolution branch and a plurality of hierarchical point-wise refining blocks from a hierarchy of hierarchical point-wise refining blocks of a refinement branch;
  determining, utilizing one or more deconvolutional layers of the deconvolution branch, a first decoded feature map based on a first encoded feature map from the encoded feature maps;
  generating, utilizing a first hierarchical point-wise refining block of the hierarchy of hierarchical point-wise refinement blocks, an uncertainty map based on the first decoded feature map, the uncertainty map indicating pixels having an associated uncertainty that the pixels correspond to the one or more objects or do not correspond to the one or more objects; and
  determining, utilizing the first hierarchical point-wise refining block, the initial segmentation mask for the digital visual media item based on the uncertainty map, the first decoded feature map, and a second encoded feature map from the encoded feature maps; and
recursively refine the initial segmentation mask utilizing additional hierarchical point-wise refining blocks of the hierarchy of hierarchical point-wise refining blocks based on additional encoded feature maps from the encoded feature maps extracted by the shared encoder and additional decoded feature maps from the deconvolution branch,
  wherein the recursively refining comprises refining the initial segmentation mask by each of the additional hierarchical point-wise refining blocks, and
  wherein encodings of coarse-to-fine variations generated via the additional hierarchical point-wise refining blocks are provided back to the deconvolution branch such that at least some of the additional decoded feature maps are generated based on the generated encodings of coarse-to-fine variations.

18. The non-transitory computer-readable medium of claim 17, further comprising instructions that, when executed by the at least one processor, cause the computing device to modify the digital visual media item using the initial segmentation mask as refined by additional hierarchical point-wise refining blocks.

19. The non-transitory computer-readable medium of claim 17, wherein recursively refining the initial segmentation mask utilizing the additional hierarchical point-wise refining blocks comprises generating, utilizing an additional hierarchical point-wise refining block, an additional segmentation mask by reclassifying one or more pixels of the initial segmentation mask.

20. The non-transitory computer-readable medium of claim 19, further comprising instructions that, when executed by the at least one processor, cause the computing device to:
  generate, utilizing a mask encoding layer of the recursive decoder, encodings of coarse-to-fine variations based on the initial segmentation mask and the additional segmentation mask; and
  determine, utilizing the one or more deconvolutional layers of the deconvolution branch, a second decoded feature map based on at least one encoded feature map generated by the shared encoder and the encodings of the coarse-to-fine variations.

* * * * *